US012635732B2

(12) United States Patent
Butin et al.

(10) Patent No.: US 12,635,732 B2
(45) Date of Patent: May 26, 2026

(54) AEROSOL-GENERATING DEVICE AND SYSTEM COMPRISING AN INDUCTIVE HEATING DEVICE AND METHOD OF OPERATING THE SAME

(71) Applicant: Philip Morris Products S.A., Neuchatel (CH)

(72) Inventors: Yannick Butin, Marin-Epagnier (CH); Lucas Gattoni, Morges (CH); Farhang Mohseni, Neuchatel (CH); Milica Nesovic, Neuchatel (CH); Enrico Stura, Palezieux-Village (CH)

(73) Assignee: Philip Morris Products S.A., Neuchatel (CH)

( * ) Notice: Subject to any disclaimer, the term of this patent is extended or adjusted under 35 U.S.C. 154(b) by 319 days.

(21) Appl. No.: 18/258,239

(22) PCT Filed: Dec. 23, 2021

(86) PCT No.: PCT/EP2021/087573
§ 371 (c)(1),
(2) Date: Jun. 19, 2023

(87) PCT Pub. No.: WO2022/136674
PCT Pub. Date: Jun. 30, 2022

(65) Prior Publication Data
US 2024/0057671 A1 Feb. 22, 2024

(30) Foreign Application Priority Data
Dec. 23, 2020 (EP) .................................... 20217040

(51) Int. Cl.
*A24F 40/465* (2020.01)
*A24F 40/53* (2020.01)
(Continued)

(52) U.S. Cl.
CPC ............ *A24F 40/465* (2020.01); *A24F 40/53* (2020.01); *A24F 40/57* (2020.01); *H05B 6/108* (2013.01)

(58) Field of Classification Search
None
See application file for complete search history.

(56) References Cited

U.S. PATENT DOCUMENTS

2016/0150825 A1 * 6/2016 Mironov ................ H05B 6/105 219/634
2017/0071250 A1 3/2017 Mironov et al.
(Continued)

FOREIGN PATENT DOCUMENTS

CN 107692316 A 2/2018
CN 112087962 A 12/2020
(Continued)

OTHER PUBLICATIONS

International Search Report issued Apr. 8, 2022 in PCT/EP2021/087573 filed on Dec. 23, 2021, citing documents 1-3 & 15-17 therein, 3 pages.
(Continued)

*Primary Examiner* — Cynthia Szewczyk
(74) *Attorney, Agent, or Firm* — Oblon, McClelland, Maier & Neustadt, L.L.P.

(57) ABSTRACT

A method for controlling aerosol production in an aerosol-generating device including an inductive heating arrangement and a power source to provide power, including: performing, during a first heating phase, a calibration process for defining first and second calibration values associated with respective first and second calibration temperatures of a susceptor to heat an aerosol-forming substrate; and during a second heating phase, controlling power to maintain a target operating value within the values, controlling the power to cause an increase of susceptor temperature,
(Continued)

monitoring a value associated with current, interrupting power when the value reaches a first extremum corresponding to the second calibration value, monitoring the value until it reaches a second extremum corresponding to the first calibration value, and in response to determining that the value reached a minimum, repeating the steps, the calibration values corresponding to values associated with current measured during a first repetition of the steps.

20 Claims, 6 Drawing Sheets

(51) Int. Cl.
*A24F 40/57* (2020.01)
*H05B 6/10* (2006.01)

(56) References Cited

U.S. PATENT DOCUMENTS

| | | | | |
|---|---|---|---|---|
| 2019/0320720 | A1 | 10/2019 | Mironov et al. | |
| 2020/0178560 | A1 | 6/2020 | Gerber et al. | |
| 2020/0187560 | A1* | 6/2020 | Trzecieski | A24F 40/44 |
| 2021/0145071 | A1 | 5/2021 | Butin et al. | |
| 2021/0244094 | A1* | 8/2021 | Gallagher | A24F 40/60 |
| 2022/0225475 | A1* | 7/2022 | Bleloch | H05B 6/06 |

FOREIGN PATENT DOCUMENTS

| | | | |
|---|---|---|---|
| JP | 2014-500017 | A | 1/2014 |
| JP | 2019-535283 | A | 12/2019 |
| JP | 2020-512662 | A | 4/2020 |
| JP | 2020-535838 | A | 12/2020 |
| RU | 2 605 837 | C2 | 12/2016 |
| RU | 2 678 378 | C1 | 1/2019 |
| RU | 2 711 158 | C1 | 1/2020 |
| RU | 2 732 085 | C2 | 9/2020 |
| WO | WO 2014/102091 | A1 | 7/2014 |
| WO | WO 2015/177255 | A1 | 11/2015 |
| WO | WO 2015/177256 | | 11/2015 |
| WO | WO 2015/177263 | A1 | 11/2015 |
| WO | WO 2015/177294 | A1 | 11/2015 |
| WO | WO 2019/002613 | A1 | 1/2019 |
| WO | WO 2020/223350 | A1 | 11/2020 |

OTHER PUBLICATIONS

International Preliminary Report on Patentability and Written Opinion issued Jun. 13, 2023 in PCT/EP2021/087573, 8 pages.
Combined Russian Decision on Grant and Search Report issued May 26, 2025 in Russian Patent Application No. 2023119311/03 (with English Translation of Decision on Grant only), citing references 15-18 therein, 23 pages.
Vietnamese Office Action issued May 22, 2025 in Vietnamese Patent Application No. 1-2023-04901, 2 pages.
European Office Action issued Feb. 5, 2025 in European Patent Application No. 21835760.3, 4 pages.
Japanese Office Action dated Jan. 26, 2026, issued in Japanese Patent Application No. 2023-538792 (with English translation; Documents 16-19 being cited therein).
Israeli Office Action dated Dec. 3, 2025, issued in Israeli Application No. 303763 (Document 1 being cited therein).
Chinese Office Action dated Mar. 19, 2026, issued In Chinese Patent Application No. 202180086519.4 (with English translation: Documents 18-19 being cited therein).

* cited by examiner

AEROSOL-GENERATING DEVICE AND SYSTEM COMPRISING AN INDUCTIVE HEATING DEVICE AND METHOD OF OPERATING THE SAME

The present disclosure relates to an inductive heating device for heating an aerosol-forming substrate. The present invention further relates to an aerosol-generating device comprising such an inductive heating device and a method for controlling aerosol production in the aerosol-generating device.

Aerosol-generating devices may comprise an electrically operated heat source that is configured to heat an aerosol-forming substrate to produce an aerosol. The electrically operated heat source may be an inductive heating device. Inductive heating devices typically comprise an inductor that inductively couples to a susceptor. The inductor generates an alternating magnetic field that causes heating in the susceptor. Typically, the susceptor is in direct contact with the aerosol-forming substrate and heat is transferred from the susceptor to the aerosol-forming substrate primarily by conduction. The temperature of the aerosol-forming substrate may be controlled by controlling the temperature of the susceptor. Therefore, it is important for such aerosol-generating devices to accurately monitor and control the temperature of the susceptor to ensure optimum generation and delivery of an aerosol to a user.

It would be desirable to provide temperature monitoring and control of an inductive heating device that is accurate, reliable and inexpensive.

According to an embodiment of the present invention, there is provided a method for controlling aerosol production in an aerosol-generating device. The device may comprise an inductive heating arrangement and a power source for providing power to the inductive heating arrangement. The method may comprise: performing, during a first heating phase during user operation of the aerosol-generating device for producing an aerosol, a calibration process for defining a first calibration value and a second calibration value of the inductive heating arrangement, wherein the first calibration value is associated with a first calibration temperature of a susceptor inductively coupled to the inductive heating arrangement and the second calibration value is associated with a second calibration temperature of the susceptor, wherein the susceptor is configured to heat an aerosol-forming substrate; and during a second heating phase during user operation of the aerosol-generating device, controlling power provided to the inductive heating arrangement to maintain a target operating value of the inductive heating arrangement within the first calibration value and the second calibration value.

Performing the calibration process during user operation of the aerosol-generating device and using calibration values obtained from the calibration process to control the power provided to the inductive heating device means that the calibration values used to control the heating process are more accurate and reliable than if the calibration process were performed at manufacturing. This also improves flexibility and cost-effectiveness in that the aerosol-generating device may be calibrated for more than one type of susceptor. This is especially important if the susceptor forms part of a separate aerosol-generating article that does not form part of the aerosol-generating device. In such circumstances, calibration at manufacturing is not possible.

The inductive heating arrangement may comprise a DC/AC converter and an inductor connected to the DC/AC converter. The susceptor may be arranged to inductively couple to the inductor. Power from the power source may be supplied continually to the inductor, via the DC/AC converter. The current, conductance or resistance of the inductive heating arrangement may be determined based on a measurement, at an input side of the DC/AC converter, of a DC current drawn from the power source and, optionally, a DC supply voltage of the power source.

The second calibration temperature of the susceptor may correspond to a Curie temperature of a material of the susceptor. The first calibration temperature of the susceptor may correspond to a temperature at maximum permeability of the material of the susceptor.

The susceptor may comprise a first susceptor material having a first Curie temperature and a second susceptor material having a second Curie temperature, wherein the second Curie temperature is lower than the first Curie temperature. The second temperature of the susceptor may correspond to the second Curie temperature of the second susceptor material.

The first and second susceptor materials are preferably two separate susceptor materials that are joined together and are therefore in intimate physical contact with each other, whereby it is ensured that both susceptor materials have the same temperature due to thermal conduction. The two susceptor materials are preferably two layers or strips that are joined together along one of their major surfaces. The susceptor may further comprise yet an additional third layer of susceptor material. The third layer of susceptor material may be made of the first susceptor material. A thickness of the third layer of susceptor material may be less than a thickness of the second layer of the second susceptor material.

The first calibration value may be a first conductance value, the second calibration value may be a second conductance value, and the target operating value may be a target conductance value. Performing the calibration process may comprise the steps of: (i) controlling the power provided to the inductive heating arrangement to cause an increase of the temperature of the susceptor; (ii) monitoring a conductance value associated with the susceptor; (iii) interrupting provision of power to the inductive heating arrangement when the conductance value reaches a maximum, wherein the conductance value at the maximum corresponds to the second calibration value; and (iv) monitoring the conductance value until the conductance value reaches a minimum, wherein the conductance value at the minimum corresponds to the first calibration value.

Monitoring the conductance value may comprise measuring, at an input side of the DC/AC converter, DC current drawn from the power source. Monitoring the conductance value may further comprise measuring, at the input side of the DC/AC converter, DC voltage at the power source. This is due to the fact that there is a monotonous relationship between the actual conductance (which cannot be determined if the susceptor forms part of the article) of the susceptor and the apparent conductance determined in this way (because the susceptor will impart the conductance of the LCR-circuit (of the DC/AC converter) it will be coupled to, because the majority of the load (R) will be due to the resistance of the susceptor. The conductance is 1/R. Hence, when we in this text refer to the conductance of the susceptor, we are in fact referring to the apparent conductance if the susceptor forms part of a separate aerosol-generating article.

Performing the calibration process may further comprise, in response to determining that the conductance value has reached a minimum, repeating steps (i) to (iv). The first calibration value and the second calibration value may correspond to conductance values measured during at least a first repetition of steps (i) to (iv).

The first calibration value may be a first resistance value, the second calibration value may be a second resistance value, and the target operating value may be a target resistance value. Performing the calibration process may comprise the steps of: i) controlling the power provided to the inductive heating arrangement to cause an increase of the temperature of the susceptor; ii) monitoring a resistance value associated with the susceptor; iii) interrupting provision of power to the inductive heating arrangement when the resistance value reaches a minimum, wherein the resistance value at the minimum corresponds to the second calibration value; and iv) monitoring the resistance value until the resistance value reaches a maximum, wherein the resistance value at the maximum corresponds to the first calibration value.

Monitoring the resistance value may comprise measuring, at an input side of the DC/AC converter, DC current drawn from the power source. Monitoring the resistance value may further comprise measuring, at the input side of the DC/AC converter, DC voltage at the power source.

Performing the calibration process may further comprise, in response to determining that the resistance value has reached a maximum, repeating steps i) to iv). The first calibration value and the second calibration value may correspond to resistance values measured during at least a first repetition of steps i) to iv).

The first calibration value may be a first current value, the second calibration value may be a second current value, and the target operating value may be a target current value.

Performing the calibration process may comprise the steps of: i) controlling the power provided to the inductive heating arrangement to cause an increase of the temperature of the susceptor; ii) monitoring a current value associated with the susceptor; iii) interrupting provision of power to the inductive heating arrangement when the current value reaches a maximum, wherein the current value at the maximum corresponds to the second calibration value; and iv) monitoring the conductance value until the conductance value reaches a minimum, wherein the current value at the minimum corresponds to the first calibration value.

Monitoring the current value may comprise measuring, at an input side of the DC/AC converter, DC current drawn from the power source. Monitoring the current value may further comprise measuring, at the input side of the DC/AC converter, DC voltage at the power source.

Performing the calibration process may further comprise, in response to determining that the current value has reached a minimum, repeating steps i) to iv). The first calibration value and the second calibration value may correspond to current values measured during at least a first repetition of steps i) to iv).

The calibration process is both quick and reliable without delaying aerosol-production. Furthermore, repeating the steps of the calibration process significantly improves subsequent temperature regulation because heat has had more time to distribute within the substrate.

The method may further comprise, during the second heating phase, performing the calibration process in response to detecting one or more of: a predetermined duration of time, a predetermined number of user puffs, and a predetermined voltage value of the power source.

Conditions may change during user operation of the aerosol-generating device. For example, the susceptor may move relative to the inductive heating arrangement, the power source (for example, a battery) may lose some efficiency over time and so on. Accordingly, performing the calibration process periodically ensures the reliability of the calibration values, thereby ensuring that optimal temperature regulation is maintained throughout use of the aerosol-generating device.

The method may further comprise, during the first heating phase, performing a pre-heating process. The pre-heating process may be performed before the calibration process, and the pre-heating process may have a predetermined duration.

The pre-heating process may comprise the steps of: (i) controlling the power provided to the inductive heating arrangement to cause an increase of the temperature of the susceptor; (ii) monitoring, at the power source, a conductance value associated with the susceptor; and (iii) interrupting provision of power to the susceptor when the conductance value reaches a minimum.

The pre-heating process may further comprise, if the conductance value reaches a minimum before the end of the predetermined duration of the pre-heating process, repeating steps (i) to (iii) of the pre-heating process until the end of the pre-determined duration of the pre-heating process. The pre-determined duration enables heat to spread within the substrate in time to reach the minimum conductance value measured during the calibration process no matter what the physical condition of the substrate (for example, if the substrate is dry or humid). This ensures reliability of the calibration process.

The pre-heating process may further comprise, if the conductance value of the susceptor does not reach a minimum during the predetermined duration of pre-heating process, ceasing operation of the aerosol-generating device. The susceptor is preferably comprised in an aerosol-generating article that is configured to be inserted into the aerosol-generating device. Aerosol-generating articles that are not configured to be used with the aerosol-generating device will not exhibit the same behavior as authorized aerosol-generating articles. Specifically, the conductance of the susceptor will not reach a minimum during the pre-determined duration of the pre-heating process. Accordingly, this prevents the use of non-authorized aerosol-generating articles.

The pre-heating process may comprise the steps of: i) controlling the power provided to the inductive heating arrangement to cause an increase of the temperature of the susceptor; ii) monitoring, at the power source, a resistance value associated with the susceptor; and iii) interrupting provision of power to the susceptor when the resistance value reaches a maximum.

If the resistance value reaches a maximum before the end of the predetermined duration of the pre-heating process, steps (i) to (iii) of the pre-heating process may be repeated until the end of the pre-determined duration of the pre-heating process.

If the resistance value associated with the susceptor does not reach a maximum during the predetermined duration of pre-heating process, operation of the aerosol-generating device may be ceased.

The pre-heating process may comprise the steps of: i) controlling the power provided to the inductive heating arrangement to cause an increase of the temperature of the susceptor; ii) monitoring, at the power source, a current value associated with the susceptor; and iii) interrupting provision of power to the susceptor when the current value reaches a minimum.

If the current value reaches a minimum before the end of the predetermined duration of the pre-heating process, steps (i) to (iii) of the pre-heating process may be repeated until the end of the pre-determined duration of the pre-heating process.

If the current value associated with the susceptor does not reach a minimum during the predetermined duration of pre-heating process, operation of the aerosol-generating device may be ceased.

During the pre-heating process, power from the power source may be supplied continuously to the inductor, via the DC/AC converter.

The calibration process may be performed in response to detecting the end of the predetermined duration of the pre-heating process. The pre-heating process may be performed in response to detecting a user input. The user input may correspond to a user activation of the aerosol-generating device.

The aerosol-generating device may be configured to removably receive an aerosol-generating article, wherein the aerosol-generating article comprises the susceptor and the aerosol-forming substrate, and wherein the pre-heating process is performed in response to detecting a presence of the aerosol-generating article in the aerosol-generating device. The pre-determined duration may be between 10 seconds and 15 seconds.

The susceptor is preferably comprised in an aerosol-generating article that is configured to be inserted into the aerosol-generating device. Aerosol-generating articles that are not configured to be used with the aerosol-generating device will not exhibit the same behavior as authorized aerosol-generating articles. Specifically, the conductance of the susceptor will not reach a minimum during the pre-determined duration of the pre-heating process. Accordingly, this prevents the use of non-authorized aerosol-generating articles.

Controlling the power provided to the inductive heating arrangement during the second heating phase may further comprise controlling the power provided to the inductive heating arrangement to cause a step-wise increase of the target operating value from a first target operating value associated with a first operating temperature of the susceptor to a second target operating value associated with a second operating temperature of the susceptor. The first operating temperature may be sufficient for the aerosol-forming substrate to form an aerosol.

Controlling the power provided to the inductive heating arrangement to cause the step-wise increase of a temperature of the susceptor enables generation of an aerosol over a sustained period encompassing the full user experience of a number of puffs, for example 14 puffs, or a predetermined time interval, such as 6 minutes, where the deliveries (nicotine, flavors, aerosol volume and so on) are substantially constant for each puff throughout the user experience. Specifically, the stepwise increase if the temperature of the susceptor prevents the reduction of aerosol delivery due to substrate depletion and reduced thermodiffusion over time. Furthermore, the step-wise increase in temperature allows for the heat to spread within the substrate at each step.

The first operating temperature may be between 150 degrees Celsius and 330 degrees Celsius, and the second operating temperature is between 200 degrees Celsius and 400 degrees Celsius. A temperature difference between the first operating temperature and the second operating temperature may be at least 30 degrees Celsius.

The step-wise increase of the target operating value may comprise at least three consecutive steps, each step having a duration.

Controlling the power provided to the inductive heating arrangement may further comprise, for each step, maintaining the target operating value of the inductive heating arrangement at a value associated with the respective step for the duration of the respective step. Maintaining the target operating value of the inductive heating arrangement value may comprise determining one of a current value, a conductance value, or a resistance value associated with the susceptor and adjusting the power provided to the inductive heating arrangement based on the determined conductance value.

The duration of each step is at least 10 seconds. The duration of each step may be between 30 seconds and 200 seconds. The duration of each step may be between 40 seconds and 160 seconds. The duration of each step may be predetermined. The duration of each step may correspond to a predetermined number of user puffs. The first step of the consecutive steps may have a longer duration than subsequent temperature steps.

Power from the power source may be supplied to the inductor, via the DC/AC converter, as a plurality of pulses, each pulse separated by a time interval.

Controlling the power provided to the inductive heating arrangement may comprise controlling the time interval between each of the plurality of pulses.

Controlling the power provided to the inductive heating arrangement may comprise controlling a length of each pulse of the plurality of pulses.

The first heating phase and the second heating phase may be phases of user operation of the aerosol-generating device.

The first calibration temperature may be between 150 degrees Celsius and 350 degrees Celsius, and the second calibration temperature may be between 200 degrees Celsius and 400 degrees Celsius. A temperature difference between the first calibration temperature and the second calibration temperature may be at least 50 degrees Celsius.

According to another embodiment of the present invention, there is provided an aerosol-generating device. The aerosol-generating device may comprise: a power source for providing a DC supply voltage and a DC current and power supply electronics connected to the power source. The power supply electronics may comprise: a DC/AC converter and an inductor connected to the DC/AC converter for the generation of an alternating magnetic field, when energized by an alternating current from the DC/AC converter, the inductor being couplable to a susceptor, wherein the susceptor is configured to heat an aerosol-forming substrate; and a controller. The controller may be configured to perform, during a first heating phase during user operation of the aerosol-generating device for generating an aerosol, a calibration process for defining a first calibration value and a second calibration value of the power supply electronics, wherein the first calibration value is associated with a first calibration temperature of the susceptor and the second calibration value is associated with a second calibration temperature of the susceptor; and during a second heating phase during user operation of the aerosol-generating device for producing an aerosol, control power provided to the power supply electronics to maintain a target operating value of the power supply electronics within the first calibration value and the second calibration value.

Power from the power source may be supplied continually to the inductor, via the DC/AC converter.

The second calibration temperature of the susceptor may correspond to a Curie temperature of a material of the susceptor. The first calibration temperature of the susceptor may correspond to a temperature at maximum permeability of the material of the susceptor. The first calibration value may be a first conductance value, the second calibration value is a second conductance value, and the target operating value is a target conductance value. Performing the calibration process may comprise the steps of: (i) controlling the power provided to the power supply electronics to cause an increase of the temperature of the susceptor; (ii) monitoring a conductance value associated with the susceptor; (iii) interrupting provision of power to the power supply electronics when the conductance value reaches a maximum, wherein the conductance value at the maximum corresponds to the second calibration value; and (iv) monitoring the conductance value until the conductance value reaches a minimum, wherein the conductance value at the minimum corresponds to the first calibration value.

Monitoring the conductance value may comprises measuring, at an input side of the DC/AC converter, DC current drawn from the power source. Monitoring the conductance value may further comprise measuring, at the input side of the DC/AC converter, DC voltage at the power source.

Performing the calibration process may further comprise, in response to determining that the conductance value has reached a minimum, repeating steps (i) to (iv). The first calibration value and the second calibration value may correspond to conductance values measured during at least a first repetition of steps (i) to (iv).

The first calibration value may be a first resistance value, the second calibration value may be a second resistance value, and the target operating value may be a target resistance value. Performing the calibration process may comprise the steps of: i) controlling the power provided to the inductive heating arrangement to cause an increase of the temperature of the susceptor; ii) monitoring a resistance value associated with the susceptor; iii) interrupting provision of power to the inductive heating arrangement when the resistance value reaches a minimum, wherein the resistance value at the minimum corresponds to the second calibration value; and iv) monitoring the resistance value until the resistance value reaches a maximum, wherein the resistance value at the maximum corresponds to the first calibration value.

Monitoring the resistance value may comprise measuring, at an input side of the DC/AC converter, DC current drawn from the power source. Monitoring the resistance value may further comprise measuring, at the input side of the DC/AC converter, DC voltage at the power source.

Performing the calibration process may further comprise, in response to determining that the resistance value has reached a maximum, repeating steps i) to iv).

The first calibration value and the second calibration value may correspond to resistance value measured during at least a first repetition of steps i) to iv).

The first calibration value may be a first current value, the second calibration value may be a second current value, and the target operating value may be a target current value. Performing the calibration process may comprise the steps of: i) controlling the power provided to the inductive heating arrangement to cause an increase of the temperature of the susceptor; ii) monitoring a current value associated with the susceptor; iii) interrupting provision of power to the inductive heating arrangement when the current value reaches a maximum, wherein the current value at the maximum corresponds to the second calibration value; and iv) monitoring the conductance value until the conductance value reaches a minimum, wherein the current value at the minimum corresponds to the first calibration value.

Monitoring the current value may comprise measuring, at an input side of the DC/AC converter, DC current drawn from the power source. Monitoring the current value may further comprise measuring, at the input side of the DC/AC converter, DC voltage at the power source.

Performing the calibration process may further comprise, in response to determining that the current value has reached a minimum, repeating steps i) to iv). The first calibration value and the second calibration value may correspond to current values measured during at least a first repetition of steps i) to iv).

The controller may be further configured to, during the second heating phase, perform the calibration process in response to detecting one or more of: a predetermined duration of time, a predetermined number of user puffs, and a predetermined voltage value of the power source.

The controller may be further configured to, during the first heating phase, perform a pre-heating process. The controller may be configured to perform the pre-heating process before the calibration process, and wherein the pre-heating process has a predetermined duration.

The pre-heating process may comprise the steps of: (i) controlling the power provided to the power supply electronics to cause an increase of the temperature of the susceptor; (ii) monitoring, at the power source, a conductance value associated with the susceptor; and (iii) interrupting provision of power to the power supply electronics when the conductance value reaches a minimum. During the pre-heating process, power from the power source is supplied continuously to the inductor, via the DC/AC converter.

The controller may be further configured to, if the conductance value reaches a minimum before the end of the predetermined duration of the pre-heating process, repeat steps i) to iii) of the pre-heating process until the end of the pre-determined duration of the pre-heating process.

The controller may be further configured to: if the conductance value of the susceptor does not reach a minimum during the predetermined duration of pre-heating process, generate a control signal to cease operation of the aerosol-generating device.

The pre-heating process may comprise the steps of: i) controlling the power provided to the inductive heating arrangement to cause an increase of the temperature of the susceptor; ii) monitoring, at the power source, a resistance value associated with the susceptor; and iii) interrupting provision of power to the susceptor when the resistance value reaches a maximum.

The controller may be further configured to: if the resistance value reaches a maximum before the end of the predetermined duration of the pre-heating process, repeat steps (i) to (iii) of the pre-heating process until the end of the pre-determined duration of the pre-heating process.

The controller may be further configured to: if the resistance value associated with the susceptor does not reach a maximum during the predetermined duration of pre-heating process, generate a control signal to cease operation of the aerosol-generating device.

The pre-heating process may comprise the steps of: i) controlling the power provided to the inductive heating arrangement to cause an increase of the temperature of the susceptor; ii) monitoring, at the power source, a current value associated with the susceptor; and iii) interrupting provision of power to the susceptor when the current value reaches a minimum.

The controller may be further configured to: if the current value reaches a minimum before the end of the predetermined duration of the pre-heating process, repeat steps (i) to (iii) of the pre-heating process until the end of the predetermined duration of the pre-heating process.

The controller may be further configured to: if the current value associated with the susceptor does not reach a minimum during the predetermined duration of pre-heating process, generate a control signal to cease operation of the aerosol-generating device. The controller may be configured to perform the calibration process in response to detecting the end of the predetermined duration of the pre-heating process.

The controller may be configured to perform the preheating process in response to detecting a user input. The user input may correspond to a user activation of the aerosol-generating device.

The controller may be configured to perform the preheating process in response to detecting a presence of an aerosol-generating article within a predetermined threshold distance of the inductor. The pre-determined duration of the pre-heating process may be between 10 seconds and 15 seconds.

Controlling the power provided to the power supply electronics during the second heating phase may further comprise controlling the power provided to the power supply electronics to cause a step-wise increase of the target operating value from a first target operating value associated with a first operating temperature of the susceptor to a second target operating value associated with a second operating temperature of the susceptor.

The first operating temperature may be sufficient for the aerosol-forming substrate to form an aerosol.

The first operating temperature may be between 150 degrees Celsius and 330 degrees Celsius, and the second operating temperature may be between 200 degrees Celsius and 400 degrees Celsius. A temperature difference between the first operating temperature and the second operating temperature may be at least 30 degrees Celsius.

The step-wise increase of the target operating value may comprise at least three consecutive steps, each step having a duration.

Controlling the power provided to the power supply electronics may further comprise maintaining, for each step, the target operating value of the power supply electronics at value associated with the respective step for the duration of the respective step.

Maintaining the operating conductance value of the power supply electronics may comprise determining one of a current value, a conductance value or a resistance value associated with the susceptor and adjusting the power provided to the power supply electronics based on the determined conductance value. The power supply electronics may further comprise a current sensor configured to measure, at an input side of the DC/AC converter, a DC current drawn from the power source. The power supply electronics may further comprise a voltage sensor configured to measure, at the input side of the DC/AC converter, the DC supply voltage of the power source. The duration of each step may be at least 10 seconds. The duration of each step may be between 30 seconds and 200 seconds. The duration of each step may be between 40 seconds and 160 seconds. The duration of each step may be predetermined. The duration of each step may correspond to a predetermined number of user puffs. A first step of the consecutive steps may have a longer duration than subsequent steps.

Power from the power source may be supplied to the inductor, via the DC/AC converter, as a plurality of pulses, each pulse separated by a time interval. Controlling the power provided to the power supply electronics may comprise controlling the time interval between each of the plurality of pulses. Controlling the power provided to the power supply electronics may comprise controlling a length of each pulse of the plurality of pulses.

The first heating phase and the second heating phase may be phases of user operation of the aerosol-generating device.

The first calibration temperature may be between 150 degrees Celsius and 350 degrees Celsius, and the second calibration temperature may be between 200 degrees Celsius and 400 degrees Celsius. A temperature difference between the first calibration temperature and the second calibration temperature may be at least 50 degrees Celsius.

The power supply electronics may further comprise a matching network for matching the impedance of the inductor to that of the susceptor.

The aerosol-generating device may further comprise a housing having a cavity configured to receive an aerosol-generating article, wherein the aerosol-generating article comprises the aerosol-forming substrate and the susceptor.

According to another embodiment of the present invention, there is provided an aerosol-generating system, comprising the aerosol-generating device described above and an aerosol-generating article. The aerosol-generating article may comprise the aerosol-forming substrate and the susceptor.

The susceptor may comprise a first layer consisting of a first material and a second layer consisting of a second material, wherein the first material is disposed in physical contact with the second material. The first material may be one of aluminum, iron, and stainless steel, and wherein the second material is nickel or a nickel alloy. The first material may have a first Curie temperature and the second material may have a second Curie temperature. The second Curie temperature may be lower than the first Curie temperature. The second calibration temperature may correspond to the second Curie temperature of the second susceptor material.

As used herein, the term "aerosol-generating device" refers to a device that interacts with an aerosol-forming substrate to generate an aerosol. An aerosol-generating device may interact with one or both of an aerosol-generating article comprising an aerosol-forming substrate, and a cartridge comprising an aerosol-forming substrate. In some examples, the aerosol-generating device may heat the aerosol-forming substrate to facilitate release of volatile compounds from the substrate. An electrically operated aerosol-generating device may comprise an atomizer, such as an electric heater, to heat the aerosol-forming substrate to form an aerosol.

As used herein, the term "aerosol-generating system" refers to the combination of an aerosol-generating device with an aerosol-forming substrate. When the aerosol-forming substrate forms part of an aerosol-generating article, the aerosol-generating system refers to the combination of the aerosol-generating device with the aerosol-generating article. In the aerosol-generating system, the aerosol-forming substrate and the aerosol-generating device cooperate to generate an aerosol.

As used herein, the term "aerosol-forming substrate" refers to a substrate capable of releasing volatile compounds that can form an aerosol. The volatile compounds may be released by heating or combusting the aerosol-forming substrate. As an alternative to heating or combustion, in some cases, volatile compounds may be released by a chemical reaction or by a mechanical stimulus, such as ultrasound. The aerosol-forming substrate may be solid or may comprise both solid and liquid components. An aerosol-forming substrate may be part of an aerosol-generating article.

As used herein, the term "aerosol-generating article" refers to an article comprising an aerosol-forming substrate that is capable of releasing volatile compounds that can form an aerosol. An aerosol-generating article may be disposable. An aerosol-generating article comprising an aerosol-forming substrate comprising tobacco may be referred to herein as a tobacco stick.

An aerosol-forming substrate may comprise nicotine. An aerosol-forming substrate may comprise tobacco, for example may comprise a tobacco-containing material containing volatile tobacco flavor compounds, which are released from the aerosol-forming substrate upon heating. In preferred embodiments an aerosol-forming substrate may comprise homogenized tobacco material, for example cast leaf tobacco. The aerosol-forming substrate may comprise both solid and liquid components. The aerosol-forming substrate may comprise a tobacco-containing material containing volatile tobacco flavor compounds, which are released from the substrate upon heating. The aerosol-forming substrate may comprise a non-tobacco material. The aerosol-forming substrate may further comprise an aerosol former. Examples of suitable aerosol formers are glycerin and propylene glycol.

As used herein, "aerosol-cooling element" refers to a component of an aerosol-generating article located downstream of the aerosol-forming substrate such that, in use, an aerosol formed by volatile compounds released from the aerosol-forming substrate passes through and is cooled by the aerosol cooling element before being inhaled by a user. An aerosol cooling element has a large surface area, but causes a low pressure drop. Filters and other mouthpieces that produce a high pressure drop, for example filters formed from bundles of fibers, are not considered to be aerosol-cooling elements. Chambers and cavities within an aerosol-generating article are not considered to be aerosol cooling elements.

As used herein, the term "mouthpiece" refers to a portion of an aerosol-generating article, an aerosol-generating device or an aerosol-generating system that is placed into a user's mouth in order to directly inhale an aerosol.

As used herein, the term "susceptor" refers to an element comprising a material that is capable of converting the energy of a magnetic field into heat. When a susceptor is located in an alternating magnetic field, the susceptor is heated. Heating of the susceptor may be the result of at least one of hysteresis losses and eddy currents induced in the susceptor, depending on the electrical and magnetic properties of the susceptor material.

As used herein when referring to an aerosol-generating device, the terms "upstream" and "front", and "downstream" and "rear", are used to describe the relative positions of components, or portions of components, of the aerosol-generating device in relation to the direction in which air flows through the aerosol-generating device during use thereof. Aerosol-generating devices according to the invention comprise a proximal end through which, in use, an aerosol exits the device. The proximal end of the aerosol-generating device may also be referred to as the mouth end or the downstream end. The mouth end is downstream of the distal end. The distal end of the aerosol-generating article may also be referred to as the upstream end. Components, or portions of components, of the aerosol-generating device may be described as being upstream or downstream of one another based on their relative positions with respect to the airflow path of the aerosol-generating device.

As used herein when referring to an aerosol-generating article, the terms "upstream" and "front", and "downstream" and "rear", are used to describe the relative positions of components, or portions of components, of the aerosol-generating article in relation to the direction in which air flows through the aerosol-generating article during use thereof. Aerosol-generating articles according to the invention comprise a proximal end through which, in use, an aerosol exits the article. The proximal end of the aerosol-generating article may also be referred to as the mouth end or the downstream end. The mouth end is downstream of the distal end. The distal end of the aerosol-generating article may also be referred to as the upstream end. Components, or portions of components, of the aerosol-generating article may be described as being upstream or downstream of one another based on their relative positions between the proximal end of the aerosol-generating article and the distal end of the aerosol-generating article. The front of a component, or portion of a component, of the aerosol-generating article is the portion at the end closest to the upstream end of the aerosol-generating article. The rear of a component, or portion of a component, of the aerosol-generating article is the portion at the end closest to the downstream end of the aerosol-generating article.

As used herein, the term "inductively couple" refers to the heating of a susceptor when penetrated by an alternating magnetic field. The heating is caused by the generation of eddy currents in the susceptor. The heating is also caused by magnetic hysteresis losses.

As used herein, the term "puff" means the action of a user drawing an aerosol into their body through their mouth or nose.

As used herein, the term "value associated with current" refers to a value determined from a measurement of current, such as a current value, a conductance value and a resistance value. The current measurement is carried out at the heating arrangement (also referred to as the power supply electronics). In particular, DC current may be measured at an input side of the DC/AC converter.

As used herein, the term "extremum" refers to the maximum or minimum value of a function or a set of values within a given range or over a whole range.

The invention is defined in the claims. However, below there is provided a non-exhaustive list of non-limiting examples. Any one or more of the features of these examples may be combined with any one or more features of another example, embodiment, or aspect described herein.

Example Ex1: A method for controlling aerosol production in an aerosol-generating device, the device comprising an inductive heating arrangement and a power source for providing power to the inductive heating arrangement, and the method comprising: performing, during a first heating phase during user operation of the aerosol-generating device for producing an aerosol, a calibration process for defining a first calibration value and a second calibration value of the inductive heating arrangement, wherein the first calibration value is associated with a first calibration temperature of a susceptor inductively coupled to the inductive heating arrangement and the second calibration value is associated with a second calibration temperature of the susceptor, wherein the susceptor is configured to heat an aerosol-forming substrate; and during a second heating phase during user operation of the aerosol-generating device, controlling power provided to the inductive heating arrangement to maintain a target operating value of the inductive heating arrangement within the first calibration value and the second calibration value.

Example Ex2: The method according example Ex1, wherein the second calibration temperature of the susceptor corresponds to a Curie temperature of a material of the susceptor, and wherein the first calibration temperature of the susceptor corresponds to a temperature at maximum permeability of the material of the susceptor.

Example Ex3: The method according to example Ex1 or Ex2, wherein the susceptor comprises a first susceptor material having a first Curie temperature and a second susceptor material having a second Curie temperature, wherein the second Curie temperature is lower than the first Curie temperature, and wherein the second calibration temperature of the susceptor corresponds to the second Curie temperature of the second susceptor material.

Example Ex4: The method according to any of examples Ex1 to Ex3, wherein the first calibration value is a first conductance value, the second calibration value is a second conductance value, and the target operating value is a target conductance value.

Example Ex5: The method according to example Ex4, wherein performing the calibration process comprises the steps of: (i) controlling the power provided to the inductive heating arrangement to cause an increase of the temperature of the susceptor; (ii) monitoring a conductance value associated with the susceptor; (iii) interrupting provision of power to the inductive heating arrangement when the conductance value reaches a maximum, wherein the conductance value at the maximum corresponds to the second calibration value; and (iv) monitoring the conductance value until the conductance value reaches a minimum, wherein the conductance value at the minimum corresponds to the first calibration value.

Example Ex6: The method according to example Ex5, wherein monitoring the conductance value comprises measuring, at an input side of the DC/AC converter, DC current drawn from the power source.

Example Ex7: The method according to example Ex6, wherein monitoring the conductance value further comprises measuring, at the input side of the DC/AC converter, DC voltage at the power source.

Example Ex8: The method according to any of examples Ex5 to Ex7, wherein performing the calibration process further comprises, in response to determining that the conductance value has reached a minimum, repeating steps (i) to (iv).

Example Ex9: The method according to example Ex8, wherein the first calibration value and the second calibration value correspond to conductance values measured during at least a first repetition of steps (i) to (iv).

Example Ex10: The method according to any of examples Ex1 to Ex3, wherein the first calibration value is a first resistance value, the second calibration value is a second resistance value, and the target operating value is a target resistance value.

Example Ex11: The method according to example Ex10, wherein performing the calibration process comprises the steps of: i) controlling the power provided to the inductive heating arrangement to cause an increase of the temperature of the susceptor; ii) monitoring a resistance value associated with the susceptor; iii) interrupting provision of power to the inductive heating arrangement when the resistance value reaches a minimum, wherein the resistance value at the minimum corresponds to the second calibration value; and iv) monitoring the resistance value until the resistance value reaches a maximum, wherein the resistance value at the maximum corresponds to the first calibration value.

Example Ex12: The method according to example Ex11, wherein monitoring the resistance value comprises measuring, at an input side of the DC/AC converter, DC current drawn from the power source.

Example Ex13: The method according to example Ex12, wherein monitoring the resistance value further comprises measuring, at the input side of the DC/AC converter, DC voltage at the power source.

Example Ex14: The method according to any of examples Ex11 to Ex13, wherein performing the calibration process further comprises, in response to determining that the resistance value has reached a maximum, repeating steps i) to iv).

Example Ex15: The method according to example Ex14, wherein the first calibration value and the second calibration value correspond to resistance values measured during at least a first repetition of steps i) to iv).

Example Ex16: The method according to any of examples Ex1 to Ex3, wherein the first calibration value is a first current value, the second calibration value is a second current value, and the target operating value is a target current value.

Example Ex17: The method according to example Ex16, wherein performing the calibration process comprises the steps of: i) controlling the power provided to the inductive heating arrangement to cause an increase of the temperature of the susceptor; ii) monitoring a current value associated with the susceptor; iii) interrupting provision of power to the inductive heating arrangement when the current value reaches a maximum, wherein the current value at the maximum corresponds to the second calibration value; and iv) monitoring the conductance value until the conductance value reaches a minimum, wherein the current value at the minimum corresponds to the first calibration value.

Example Ex18: The method according to example Ex17, wherein monitoring the current value comprises measuring, at an input side of the DC/AC converter, DC current drawn from the power source.

Example Ex19: The method according to example Ex18, wherein monitoring the current value further comprises measuring, at the input side of the DC/AC converter, DC voltage at the power source.

Example Ex20: The method according to any of examples Ex17 to Ex19, wherein performing the calibration process further comprises, in response to determining that the current value has reached a minimum, repeating steps i) to iv).

Example Ex21: The method according to example Ex20, wherein the first calibration value and the second calibration value correspond to current values measured during at least a first repetition of steps i) to iv).

Example Ex22: The method according to any of examples 1 to 21, further comprising: during the second heating phase, performing the calibration process in response to detecting one or more of: a predetermined duration of time, a predetermined number of user puffs, and a predetermined voltage value of the power source.

Example Ex23: The method according to any of examples Ex1 to Ex22, further comprising, during the first heating phase, performing a pre-heating process, wherein the pre-heating process is performed before the calibration process, and wherein the pre-heating process has a predetermined duration.

Example Ex24: The method according to example Ex23, wherein the pre-heating process comprises the steps of: (i) controlling the power provided to the inductive heating arrangement to cause an increase of the temperature of the susceptor; (ii) monitoring, at the power source, a conductance value associated with the susceptor; and (iii) interrupting provision of power to the susceptor when the conductance value reaches a minimum.

Example Ex25: The method according to example Ex24, further comprising, if the conductance value reaches a minimum before the end of the predetermined duration of the pre-heating process, repeating steps (i) to (iii) of the pre-heating process until the end of the pre-determined duration of the pre-heating process Example Ex26: The method according to example Ex24, further comprising: if the conductance value associated with the susceptor does not reach a minimum during the predetermined duration of pre-heating process, ceasing operation of the aerosol-generating device.

Example Ex27: The method according to example Ex23, wherein the pre-heating process comprises the steps of: i) controlling the power provided to the inductive heating arrangement to cause an increase of the temperature of the susceptor; ii) monitoring, at the power source, a resistance value associated with the susceptor; and iii) interrupting provision of power to the susceptor when the resistance value reaches a maximum.

Example Ex28: The method according to example Ex27, further comprising, if the resistance value reaches a maximum before the end of the predetermined duration of the pre-heating process, repeating steps (i) to (iii) of the pre-heating process until the end of the pre-determined duration of the pre-heating process.

Example Ex29: The method according to example Ex27, further comprising: if the resistance value associated with the susceptor does not reach a maximum during the predetermined duration of pre-heating process, ceasing operation of the aerosol-generating device.

Example Ex30: The method according to example Ex23, wherein the pre-heating process comprises the steps of: i) controlling the power provided to the inductive heating arrangement to cause an increase of the temperature of the susceptor; ii) monitoring, at the power source, a current value associated with the susceptor; and iii) interrupting provision of power to the susceptor when the current value reaches a minimum.

Example Ex31: The method according to example Ex30, further comprising, if the current value reaches a minimum before the end of the predetermined duration of the pre-heating process, repeating steps (i) to (iii) of the pre-heating process until the end of the pre-determined duration of the pre-heating process Example Ex32: The method according to example Ex30, further comprising: if the current value associated with the susceptor does not reach a minimum during the predetermined duration of pre-heating process, ceasing operation of the aerosol-generating device.

Example Ex33: The method according to any of examples Ex23 to Ex32, wherein, during the pre-heating process, power from the power source is supplied continuously to the inductor, via the DC/AC converter.

Example Ex34: The method according to any of examples Ex23 to Ex33, wherein the calibration process is performed in response to detecting the end of the predetermined duration of the pre-heating process.

Example Ex35: The method according to any of examples Ex23 to Ex33, wherein the pre-heating process is performed in response to detecting a user input.

Example Ex36: The method according to example Ex35, wherein the user input corresponds to a user activation of the aerosol-generating device.

Example Ex37: The method according to any of examples Ex23 to Ex33, wherein the aerosol-generating device is configured to removably receive an aerosol-generating article, wherein the aerosol-generating article comprises the susceptor and the aerosol-forming substrate, and wherein the pre-heating process is performed in response to detecting a presence of the aerosol-generating article in the aerosol-generating device.

Example Ex38: The method according to any of examples Ex23 to Ex37, wherein the pre-determined duration is between 10 seconds and 15 seconds.

Example Ex39: The method according to any of examples Ex1 to Ex38, wherein controlling the power provided to the inductive heating arrangement during the second heating phase further comprises controlling the power provided to the inductive heating arrangement to cause a step-wise increase of the target operating value from a first target operating value associated with a first operating temperature of a susceptor to a second target operating value associated with a second operating temperature of a susceptor.

Example Ex40: The method of example Ex39, wherein the first operating temperature is sufficient for the aerosol-forming substrate to form an aerosol.

Example Ex41: The method according to example Ex40, wherein the first operating temperature is between 150 degrees Celsius and 330 degrees Celsius, and the second operating temperature is between 200 degrees Celsius and 400 degrees Celsius, and wherein a temperature difference between the first operating temperature and the second operating temperature is at least 30 degrees Celsius.

Example Ex42: The method according to any of examples Ex39 to Ex41, wherein the step-wise increase of the target operating value comprises at least three consecutive steps each step having a predetermined duration.

Example Ex43: The method according to example Ex42, wherein controlling the power provided to the inductive heating arrangement further comprises, for each step, maintaining the target operating value of the inductive heating arrangement at a value associated with the respective step for the duration of the respective step.

Example Ex44: The method according to example Ex43, wherein maintaining the target operating value of the inductive heating arrangement comprises determining one of a current value, a conductance value and a resistance value associated with the susceptor and adjusting the power provided to the inductive heating arrangement based on the determined value.

Example Ex45: The method according to any of examples Ex39 to Ex44, wherein the duration of the steps is at least 10 seconds.

Example Ex46: The method according to any of examples Ex39 to Ex44, wherein the duration of the steps is between 30 seconds and 200 seconds.

Example Ex47: The method according to any of examples Ex39 to Ex44, wherein the duration of the steps is between 40 seconds and 160 seconds.

Example Ex48. The method according to any of examples Ex39 to Ex47, wherein the duration of each step is predetermined.

Example Ex49: The method according to any of examples Ex39 to Ex44, wherein the duration of the steps corresponds to a predetermined number of user puffs.

Example Ex50: The method according to any of examples Ex39 to Ex44, wherein a first step of the consecutive steps has a longer duration than subsequent steps.

Example Ex51: The method according to any of examples Ex1 to Ex49, wherein the inductive heating arrangement comprises the DC/AC converter and the inductor connected to the DC/AC converter.

Example Ex52: The method according to example Ex51, wherein power from the power source is supplied continually to the inductor, via the DC/AC converter.

Example Ex53: The method according to example Ex51 or Ex52, wherein power from the power source is supplied to the inductor, via the DC/AC converter, as a plurality of pulses, each pulse separated by a time interval.

Example Ex54: The method according to example Ex53, wherein controlling the power provided to the inductive heating arrangement comprises controlling the time interval between each of the plurality of pulses.

Example Ex55: The method according to example Ex53, wherein controlling the power provided to the inductive heating arrangement comprises controlling a length of each pulse of the plurality of pulses.

Example Ex56: The method according to any of examples Ex1 to Ex55, wherein the first calibration temperature is between 150 degrees Celsius and 350 degrees Celsius, and the second calibration temperature is between 200 degrees Celsius and 400 degrees Celsius, and wherein a temperature difference between the first calibration temperature and the second calibration temperature is at least 50 degrees Celsius.

Example Ex57: An aerosol-generating device comprising: a power source for providing a DC supply voltage and a DC current; power supply electronics connected to the power source, wherein the power supply electronics comprise: a DC/AC converter; and an inductor connected to the DC/AC converter for the generation of an alternating magnetic field, when energized by an alternating current from the DC/AC converter, the inductor being couplable to a susceptor, wherein the susceptor is configured to heat an aerosol-forming substrate; and a controller configured to: perform, during a first heating phase during user operation of the aerosol-generating device for generating an aerosol, a calibration process for defining a first calibration value and a second calibration value of the power supply electronics, wherein the first calibration value is associated with a first calibration temperature of the susceptor and the second calibration value is associated with a second calibration temperature of the susceptor; and during a second heating phase during user operation of the aerosol-generating device for producing an aerosol, control power provided to the power supply electronics to maintain a target operating value of the power supply electronics within the first calibration value and the second calibration value.

Example Ex58: The aerosol-generating device according to example Ex57, wherein power from the power source is supplied continually to the inductor, via the DC/AC converter.

Example Ex59: The aerosol-generating device according to example Ex57 or Ex58, wherein the second calibration temperature of the susceptor corresponds to a Curie temperature of a material of the susceptor.

Example Ex60: The aerosol-generating device according to example Ex59, wherein the first calibration temperature of the susceptor corresponds to a temperature at maximum permeability of the material of the susceptor.

Example Ex61: The aerosol-generating device according to any of examples Ex57 to Ex60, wherein the first calibration value is a first conductance value, the second calibration value is a second conductance value, and the target operating value is a target conductance value.

Example Ex62: The aerosol-generating device according to example Ex61, wherein performing the calibration process comprises the steps of: (i) controlling the power provided to the power supply electronics to cause an increase of the temperature of the susceptor; (ii) monitoring a conductance value associated with the susceptor; (iii) interrupting provision of power to the power supply electronics when the conductance value reaches a maximum, wherein the conductance value at the maximum corresponds to the second calibration value; and (iv) monitoring the conductance value until the conductance value reaches a minimum, wherein the conductance value at the minimum corresponds to the first calibration value.

Example Ex63: The aerosol-generating device according to example Ex62, wherein monitoring the conductance value comprises measuring, at an input side of the DC/AC converter, DC current drawn from the power source.

Example Ex64: The aerosol-generating device according to example Ex63, wherein monitoring the conductance value further comprises measuring, at the input side of the DC/AC converter, DC voltage at the power source.

Example Ex65: The aerosol-generating device according to any of examples Ex62 to Ex65, wherein performing the calibration process further comprises, in response to determining that the conductance value has reached a minimum, repeating steps (i) to (iv).

Example Ex66: The aerosol-generating device according to example Ex65, wherein the first calibration value and the second calibration value correspond to conductance values measured during at least a first repetition of steps (i) to (iv).

Example Ex67: The aerosol-generating device according to any of examples Ex57 to Ex60, wherein the first calibration value is a first resistance value, the second calibration value is a second resistance value, and the target operating value is a target resistance value.

Example Ex68: The aerosol-generating device according to example Ex67, wherein performing the calibration process comprises the steps of: i) controlling the power provided to the inductive heating arrangement to cause an increase of the temperature of the susceptor; ii) monitoring a resistance value associated with the susceptor; iii) interrupting provision of power to the inductive heating arrangement when the resistance value reaches a minimum, wherein the resistance value at the minimum corresponds to the second calibration value; and iv) monitoring the resistance value until the resistance value reaches a maximum, wherein the resistance value at the maximum corresponds to the first calibration value.

Example Ex69: The aerosol-generating device according to example Ex68, wherein monitoring the resistance value comprises measuring, at an input side of the DC/AC converter, DC current drawn from the power source.

Example Ex70: The aerosol-generating device according to example Ex69, wherein monitoring the resistance value further comprises measuring, at the input side of the DC/AC converter, DC voltage at the power source.

Example Ex71: The aerosol-generating device according to any of examples Ex68 to Ex70, wherein performing the calibration process further comprises, in response to determining that the resistance value has reached a maximum, repeating steps i) to iv).

Example Ex72: The aerosol-generating device according to example Ex71, wherein the first calibration value and the second calibration value correspond to resistance values measured during at least a first repetition of steps i) to iv).

Example Ex73: The aerosol-generating device according to any of examples Ex57 to Ex60, wherein the first calibration value is a first current value, the second calibration value is a second current value, and the target operating value is a target current value.

Example Ex74: The aerosol-generating device according to example Ex73, wherein performing the calibration process comprises the steps of: i) controlling the power provided to the inductive heating arrangement to cause an increase of the temperature of the susceptor; ii) monitoring a current value associated with the susceptor; iii) interrupting provision of power to the inductive heating arrangement when the current value reaches a maximum, wherein the current value at the maximum corresponds to the second calibration value; and iv) monitoring the conductance value until the conductance value reaches a minimum, wherein the current value at the minimum corresponds to the first calibration value.

Example Ex75: The aerosol-generating device according to example Ex74, wherein monitoring the current value comprises measuring, at an input side of the DC/AC converter, DC current drawn from the power source.

Example Ex76: The aerosol-generating device according to Example Ex75, wherein monitoring the current value further comprises measuring, at the input side of the DC/AC converter, DC voltage at the power source.

Example Ex77: The aerosol-generating device according to any of examples Ex74 to Ex76, wherein performing the calibration process further comprises, in response to determining that the current value has reached a minimum, repeating steps i) to iv).

Examples Ex78: The aerosol-generating device according to example Ex77, wherein the first calibration value and the second calibration value correspond to current values measured during at least a first repetition of steps i) to iv).

Example Ex79: The aerosol-generating device according to any of examples Ex57 to Ex78, wherein the controller is further configured to, during the second heating phase, perform the calibration process in response to detecting one or more of: a predetermined duration of time, a predetermined number of user puffs, and a predetermined voltage value of the power source.

Example Ex80: The aerosol-generating device according to any of examples Ex57 to Ex79, wherein the controller is further configured to, during the first heating phase, perform a pre-heating process, wherein the controller is configured to perform the pre-heating process before the calibration process, and wherein the pre-heating process has a predetermined duration.

Example Ex81: The aerosol-generating device according to example Ex80, wherein the pre-heating process comprises the steps of: (i) controlling the power provided to the power supply electronics to cause an increase of the temperature of the susceptor; (ii) monitoring, at the power source, a conductance value associated with the susceptor; and (iii) interrupting provision of power to the power supply electronics when the conductance value reaches a minimum.

Example Ex82: The aerosol-generating device according to example Ex81, wherein the controller is further configured to, if the conductance value reaches a minimum before the end of the predetermined duration of the pre-heating process, repeat steps i) to iii) of the pre-heating process until the end of the pre-determined duration of the pre-heating process.

Example Ex83: The aerosol-generating device according to example Ex81 or Ex82, wherein the controller is further configured to: if the conductance value of the susceptor does not reach a minimum during the predetermined duration of pre-heating process, generate a control signal to cease operation of the aerosol-generating device.

Example Ex84: The aerosol-generating device according to example Ex80, wherein the pre-heating process comprises the steps of: i) controlling the power provided to the inductive heating arrangement to cause an increase of the temperature of the susceptor; ii) monitoring, at the power source, a resistance value associated with the susceptor; and iii) interrupting provision of power to the susceptor when the resistance value reaches a maximum.

Example Ex85: The aerosol-generating device according to example Ex84, wherein the controller is further configured to: if the resistance value reaches a maximum before the end of the predetermined duration of the pre-heating process, repeat steps (i) to (iii) of the pre-heating process until the end of the pre-determined duration of the pre-heating process.

Example Ex86: The aerosol-generating device according to example Ex84, wherein the controller is further configured to: if the resistance value associated with the susceptor does not reach a maximum during the predetermined duration of pre-heating process, generate a control signal to cease operation of the aerosol-generating device.

Example Ex87: The aerosol-generating device according to example Ex80, wherein the pre-heating process comprises the steps of: i) controlling the power provided to the inductive heating arrangement to cause an increase of the temperature of the susceptor; ii) monitoring, at the power source, a current value associated with the susceptor; and iii) interrupting provision of power to the susceptor when the current value reaches a minimum.

Example Ex88: The aerosol-generating device according to example Ex87, wherein the controller is further configured to: if the current value reaches a minimum before the end of the predetermined duration of the pre-heating process, repeat steps (i) to (iii) of the pre-heating process until the end of the pre-determined duration of the pre-heating process.

Example Ex89: The aerosol-generating device according to example Ex87, wherein the controller is further configured to: if the current value associated with the susceptor does not reach a minimum during the predetermined duration of pre-heating process, generate a control signal to cease operation of the aerosol-generating device.

Example Ex90: The aerosol-generating device according to any of examples Ex80 to Ex89, wherein, during the pre-heating process, power from the power source is supplied continuously to the inductor, via the DC/AC converter.

Example Ex91: The aerosol-generating device according to any of examples Ex80 to Ex90, wherein the controller is configured to perform the calibration process in response to detecting the end of the predetermined duration of the pre-heating process.

Example Ex92: The aerosol-generating device according to any of examples Ex80 to Ex91, wherein the controller is configured to perform the pre-heating process in response to detecting a user input.

Example Ex93: The aerosol-generating device according to example Ex92, wherein the user input corresponds to a user activation of the aerosol-generating device.

Example Ex94: The aerosol-generating device according to any of examples Ex80 to Ex91, wherein the controller is configured to perform the pre-heating process in response to detecting a presence of an aerosol-generating article within a predetermined threshold distance of the inductor.

Example Ex95: The aerosol-generating device according to any of examples Ex80 to Ex94, wherein the pre-determined duration is between 10 seconds and 15 seconds.

Example Ex96: The aerosol-generating device according to any of examples Ex57 to Ex95, wherein controlling the power provided to the power supply electronics during the second heating phase further comprises controlling the power provided to the power supply electronics to cause a step-wise increase of the target operating value from a first target operating value associated with a first operating temperature to a second target operating value associated with a second operating temperature.

Example Ex97: The aerosol-generating device of example Ex96, wherein the first operating temperature is sufficient for the aerosol-forming substrate to form an aerosol.

Example Ex98: The aerosol-generating device according to example Ex97, wherein the first operating temperature is between 150 degrees Celsius and 330 degrees Celsius, and the second operating temperature is between 200 degrees Celsius and 400 degrees Celsius, and wherein a temperature difference between the first operating temperature and the second operating temperature is at least 30 degrees Celsius.

Example Ex99: The aerosol-generating device according to any of examples Ex96 to 98, wherein the step-wise increase of the target operating value comprises at least three consecutive steps, each step having a duration.

Example Ex100: The aerosol-generating device according to example Ex99, wherein controlling the power provided to the power supply electronics further comprises, for each step, maintaining the target operating value of the power supply electronics at a value associated with the respective step for a duration of the respective step.

Example Ex101: The aerosol-generating device according to example Ex100, wherein maintaining the target operating value of the power supply electronics comprises determining one of a current value, a conductance value and a resistance value associated with the susceptor and adjusting the power provided to the power supply electronics based on the determined value.

Example Ex102: The aerosol-generating device according to example Ex101, wherein the power supply electronics further comprise a current sensor configured to measure, at an input side of the DC/AC converter, a DC current drawn from the power source.

Example Ex103: The aerosol-generating device according to example Ex102, wherein the power supply electronics further comprise a voltage sensor configured to measure, at the input side of the DC/AC converter, the DC supply voltage of the power source.

Example Ex104: The aerosol-generating device according to any of examples Ex100 to Ex104, wherein the duration of the steps is at least 10 seconds.

Example Ex105: The aerosol-generating device according to any of examples Ex100 to Ex104, wherein the duration of the steps is between 30 seconds and 200 seconds.

Example Ex106: The aerosol-generating device according to any of examples Ex100 to Ex103, wherein the duration of the steps is between 40 seconds and 160 seconds.

Example Ex107: The aerosol-generating device according to any of examples Ex100 to Ex106, wherein the duration of each step is predetermined.

Example Ex108: The aerosol-generating device according to any of examples Ex100 to 103, wherein the duration of the steps corresponds to a predetermined number of user puffs.

Example Ex109: The aerosol-generating device according to any of examples Ex100 to Ex106, wherein a first step of the consecutive steps has a longer duration than subsequent steps.

Example Ex110: The aerosol-generating device according to any of examples Ex57 to Ex106, wherein power from the power source is supplied to the inductor, via the DC/AC converter, as a plurality of pulses, each pulse separated by a time interval.

Example Ex111: The aerosol-generating device according to example Ex110, wherein controlling the power provided to the power supply electronics comprises controlling the time interval between each of the plurality of pulses.

Example Ex112: The aerosol-generating device according to example Ex110, wherein controlling the power provided to the power supply electronics comprises controlling a length of each pulse of the plurality of pulses.

Example Ex113: The aerosol-generating device according to any of examples Ex57 to 111, wherein the first calibration temperature is between 150 degrees Celsius and 300 degrees Celsius, and the second calibration temperature is between 200 degrees Celsius and 400 degrees Celsius, and wherein a temperature difference between the first calibration temperature and the second calibration temperature is at least 50 degrees Celsius.

Example Ex114: The aerosol-generating device according to any of examples Ex57 to Ex113, wherein the power supply electronics further comprises a matching network for matching the impedance of the inductor to that of the susceptor.

Example Ex115: The aerosol-generating device according to any of examples Ex57 to Ex114, further comprising a housing having a cavity configured to receive an aerosol-generating article, wherein the aerosol-generating article comprises the aerosol-forming substrate and the susceptor.

Example Ex116: An aerosol-generating system, comprising: the aerosol-generating device according to any of examples Ex56 to Ex15; and an aerosol-generating article, wherein the aerosol-generating article comprises the aerosol-forming substrate and the susceptor.

Example Ex117: The aerosol-generating system according to example Ex116, wherein the susceptor comprises a first layer consisting of a first material and a second layer consisting of a second material, wherein the first material is disposed in physical contact with the second material.

Example Ex118: The aerosol-generating system according to example Ex117, wherein the first material is one of aluminum, iron, and stainless steel, and wherein the second material is nickel or a nickel alloy.

Example Ex119: The aerosol-generating system according to example Ex117 or Ex118, wherein the first material has a first Curie temperature and the second material has a second Curie temperature, wherein the second Curie temperature is lower than the first Curie temperature.

Example Ex120: The aerosol-generating system according to example Ex119, wherein the second calibration temperature corresponds to the second Curie temperature of the second susceptor material.

Examples will now be further described with reference to the figures in which.

Figure 1:
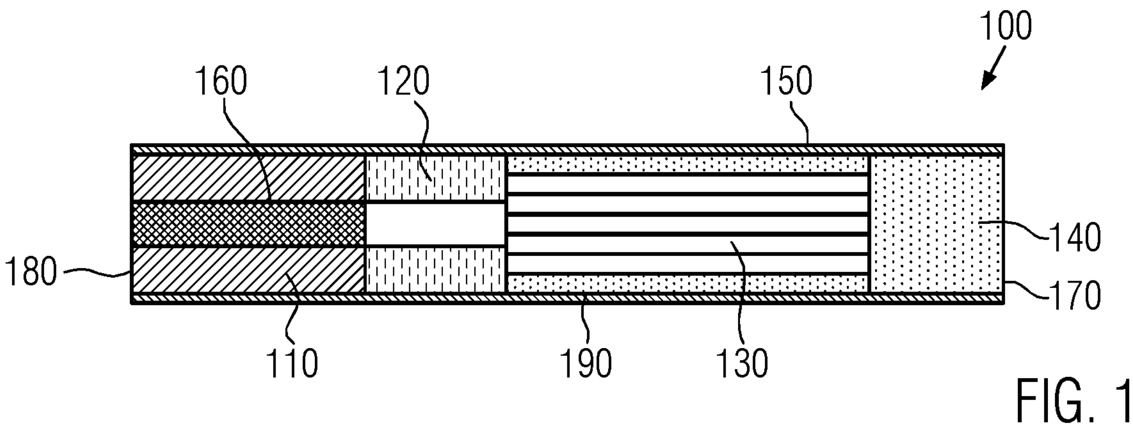
FIG. 1 shows a schematic cross-sectional illustration of an aerosol-generating article.

FIG. 1 illustrates an aerosol-generating article 100. The aerosol-generating article 100 comprises four elements arranged in coaxial alignment: an aerosol-forming substrate 110, a support element 120, an aerosol-cooling element 130, and a mouthpiece 140. Each of these four elements is a substantially cylindrical element, each having substantially the same diameter. These four elements are arranged sequentially and are circumscribed by an outer wrapper 150 to form a cylindrical rod. An elongate susceptor 160 is located within the aerosol-forming substrate 110, in contact with the aerosol-forming substrate 110. The susceptor 160 has a length that is approximately the same as the length of the aerosol-forming substrate 110, and is located along a radially central axis of the aerosol-forming substrate 110.

The susceptor 160 comprises at least two different materials. The susceptor 160 is in the form of an elongate strip, preferably having a length of 12 mm and a width of 4 mm. The susceptor 160 comprises at least two layers: a first layer of a first susceptor material disposed in physical contact with a second layer of a second susceptor material. The first susceptor material and the second susceptor material may each have a Curie temperature. In this case, the Curie temperature of the second susceptor material is lower than the Curie temperature of the first susceptor material. The first material may not have a Curie temperature. The first susceptor material may be aluminum, iron or stainless steel. The second susceptor material may be nickel or a nickel alloy. The susceptor 160 may be formed by electroplating at least one patch of the second susceptor material onto a strip of the first susceptor material. The susceptor may be formed by cladding a strip of the second susceptor material to a strip of the first susceptor material.

The aerosol-generating article 100 has a proximal or mouth end 170, which a user inserts into his or her mouth during use, and a distal end 180 located at the opposite end of the aerosol-generating article 100 to the mouth end 170. Once assembled, the total length of the aerosol-generating article 100 is preferably about 45 mm and the diameter is about 7.2 mm.

In use, air is drawn through the aerosol-generating article 100 by a user from the distal end 180 to the mouth end 170. The distal end 180 of the aerosol-generating article 100 may also be described as the upstream end of the aerosol-generating article 100 and the mouth end 170 of the aerosol-generating article 100 may also be described as the downstream end of the aerosol-generating article 100. Elements of the aerosol-generating article 100 located between the mouth end 170 and the distal end 180 can be described as being upstream of the mouth end 170 or, alternatively, downstream of the distal end 180. The aerosol-forming substrate 110 is located at the distal or upstream end 180 of the aerosol-generating article 100.

The support element 120 is located immediately downstream of the aerosol-forming substrate 110 and abuts the aerosol-forming substrate 110. The support element 120 may be a hollow cellulose acetate tube. The support element 120 locates the aerosol-forming substrate 110 at the extreme distal end 180 of the aerosol-generating article 100. The support element 120 also acts as a spacer to space the aerosol-cooling element 130 of the aerosol-generating article 100 from the aerosol-forming substrate 110.

The aerosol-cooling element 130 is located immediately downstream of the support element 120 and abuts the support element 120. In use, volatile substances released from the aerosol-forming substrate 110 pass along the aerosol-cooling element 130 towards the mouth end 170 of the aerosol-generating article 100. The volatile substances may cool within the aerosol-cooling element 130 to form an aerosol that is inhaled by the user. The aerosol-cooling element 130 may comprise a crimped and gathered sheet of polylactic acid circumscribed by a wrapper 190. The crimped and gathered sheet of polylactic acid defines a plurality of longitudinal channels that extend along the length of the aerosol-cooling element 130.

The mouthpiece 140 is located immediately downstream of the aerosol-cooling element 130 and abuts the aerosol-cooling element 130. The mouthpiece 140 comprises a conventional cellulose acetate tow filter of low filtration efficiency.

To assemble the aerosol-generating article 100, the four elements 110, 120, 130 and 140 described above are aligned and tightly wrapped within the outer wrapper 150. The outer wrapper may be a conventional cigarette paper. The susceptor 160 may be inserted into the aerosol-forming substrate 110 during the process used to form the aerosol-forming substrate 110, prior to the assembly of the plurality of elements, to form a rod.

Figure 2A:
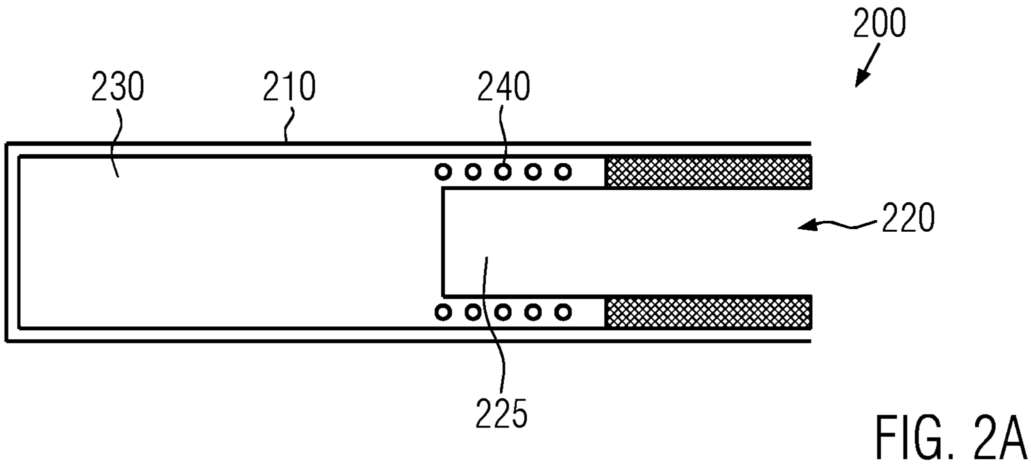
FIG. 2A shows a schematic cross-sectional illustration of an aerosol-generating device for use with the aerosol-generating article illustrated in FIG. 1.
Figure 2B:
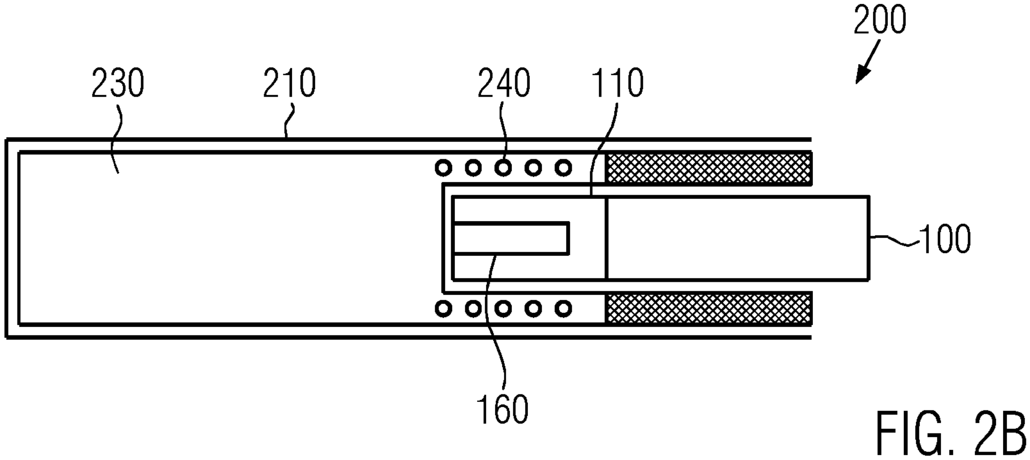
FIG. 2B shows a schematic cross-sectional illustration of the aerosol-generating device in engagement with the aerosol-generating article illustrated in FIG. 1.

The aerosol-generating article 100 illustrated in FIG. 1 is designed to engage with an aerosol-generating device, such as the aerosol-generating device 200 illustrated in FIG. 2A, for producing an aerosol. The aerosol-generating device 200 comprises a housing 210 having a cavity 220 configured to receive the aerosol-generating article 100. The aerosol-generating device 200 further comprises an inductive heating device 230 configured to heat an aerosol-generating article 100 for producing an aerosol. FIG. 2B illustrates the aerosol-generating device 200 when the aerosol-generating article 100 is inserted into the cavity 220.

Figure 3:
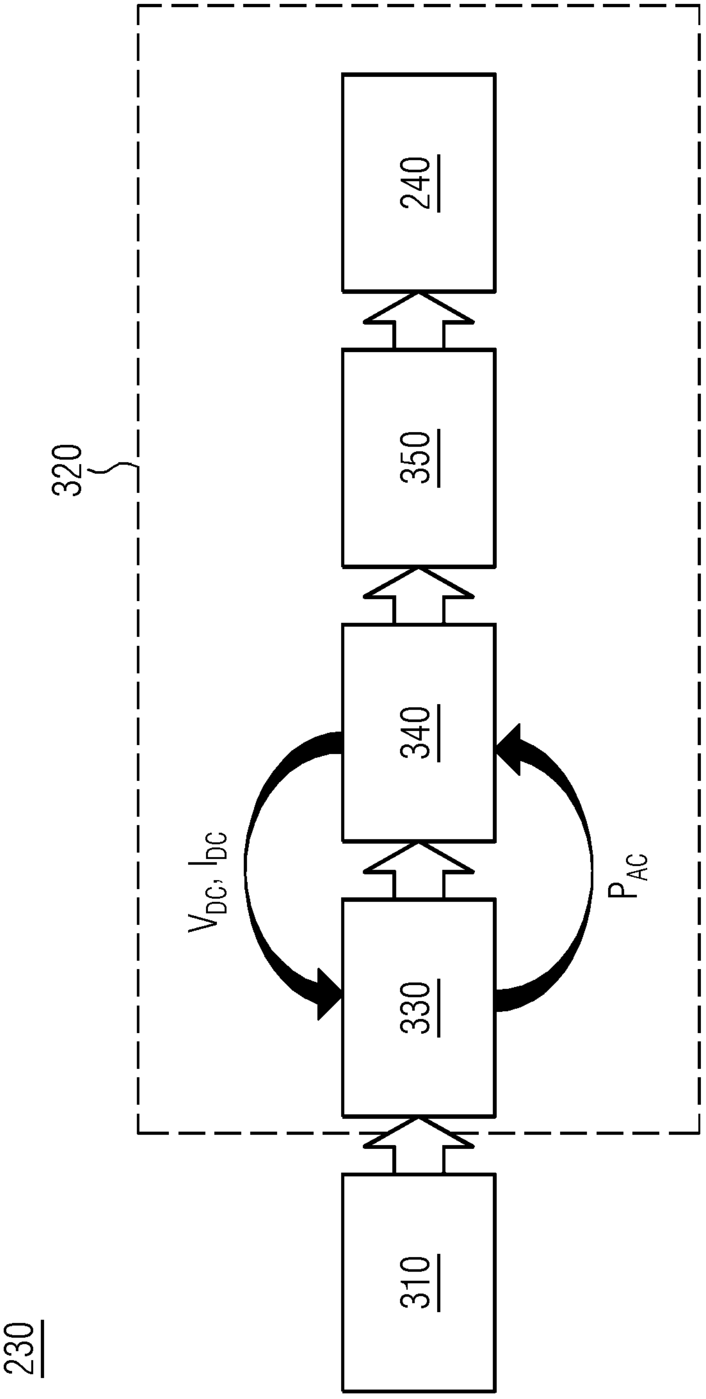
FIG. 3 is a block diagram showing an inductive heating device of the aerosol-generating device described in relation to FIG. 2.

The inductive heating device 230 is illustrated as a block diagram in FIG. 3. The inductive heating device 230 comprises a DC power source 310 and a heating arrangement 320 (also referred to as power supply electronics). The heating arrangement comprises a controller 330, a DC/AC converter 340, a matching network 350 and an inductor 240.

The DC power source 310 is configured to provide DC power to the heating arrangement 320. Specifically, the DC power source 310 is configured to provide a DC supply voltage ($V_{DC}$) and a DC current ($I_{DC}$) to the DC/AC converter 340. Preferably, the power source 310 is a battery, such as a lithium ion battery. As an alternative, the power source 310 may be another form of charge storage device such as a capacitor. The power source 310 may require recharging. For example, the power source 310 may have sufficient capacity to allow for the continuous generation of aerosol for a period of around six minutes or for a period that is a multiple of six minutes. In another example, the power source 310 may have sufficient capacity to allow for a predetermined number of puffs or discrete activations of the heating arrangement.

The DC/AC converter 340 is configured to supply the inductor 240 with a high frequency alternating current. As used herein, the term "high frequency alternating current" means an alternating current having a frequency of between about 500 kilohertz and about 30 megahertz. The high frequency alternating current may have a frequency of between about 1 megahertz and about 30 megahertz, such as between about 1 megahertz and about 10 megahertz, or such as between about 5 megahertz and about 8 megahertz.

Figure 4:
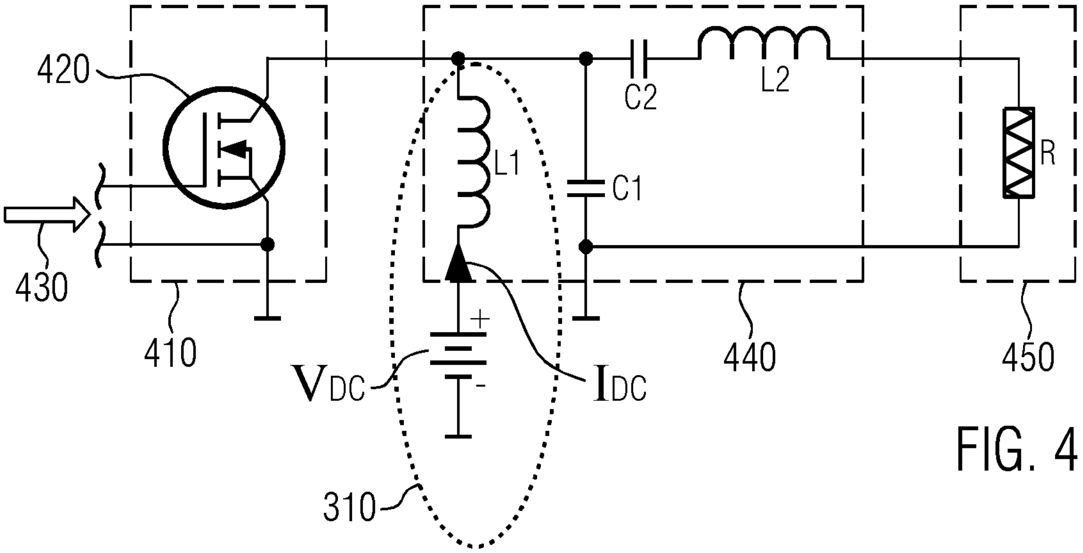
FIG. 4 is a schematic diagram showing electronic components of the inductive heating device described in relation to FIG. 3.
Figure 5:
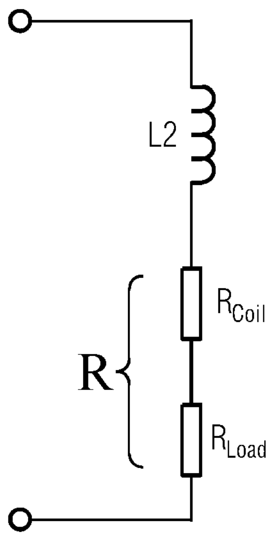
FIG. 5 is a schematic diagram on an inductor of an LC load network of the inductive heating device described in relation to FIG. 4.

FIG. 4 schematically illustrates the electrical components of the inductive heating device 230, in particular the DC/AC converter 340. The DC/AC converter 340 preferably comprises a Class-E power amplifier. The Class-E power amplifier comprises a transistor switch 410 comprising a Field Effect Transistor 420, for example a Metal-Oxide-Semiconductor Field Effect Transistor, a transistor switch supply circuit indicated by the arrow 430 for supplying a switching signal (gate-source voltage) to the Field Effect Transistor 420, and an LC load network 440 comprising a shunt capacitor C1 and a series connection of a capacitor C2 and inductor L2, corresponding to inductor 240. In addition, the DC power source 310, comprising a choke L1, is shown for supplying the DC supply voltage $V_{DC}$, with a DC current $I_{DC}$ being drawn from the DC power source 310 during operation. The ohmic resistance R representing the total ohmic load 450, which is the sum of the ohmic resistance $R_{coil}$ of the inductor L2 and the ohmic resistance $R_{load}$ of the susceptor 160, is shown in more detail in FIG. 5.

Although the DC/AC converter 340 is illustrated as comprising a Class-E power amplifier, it is to be understood that the DC/AC converter 340 may use any suitable circuitry that converts DC current to AC current. For example, the DC/AC converter 340 may comprise a class-D power amplifier comprising two transistor switches. As another example, the DC/AC converter 340 may comprise a full bridge power inverter with four switching transistors acting in pairs.

Turning back to FIG. 3, the inductor 240 may receive the alternating current from the DC/AC converter 340 via a matching network 350 for optimum adaptation to the load, but the matching network 350 is not essential. The matching network 350 may comprise a small matching transformer. The matching network 350 may improve power transfer efficiency between the DC/AC converter 340 and the inductor 240.

As illustrated in FIG. 2A, the inductor 240 is located adjacent to the distal portion 225 of the cavity 220 of the aerosol-generating device 200. Accordingly, the high frequency alternating current supplied to the inductor 240 during operation of the aerosol-generating device 200 causes the inductor 240 to generate a high frequency alternating magnetic field within the distal portion 225 of the aerosol-generating device 200. The alternating magnetic field preferably has a frequency of between 1 and 30 megahertz, preferably between 2 and 10 megahertz, for example between 5 and 7 megahertz. As can be seen from FIG. 2B, when an aerosol-generating article 100 is inserted into the cavity 200, the aerosol-forming substrate 110 of the aerosol-generating article 100 is located adjacent to the inductor 240 so that the susceptor 160 of the aerosol-generating article 100 is located within this alternating magnetic field. When the alternating magnetic field penetrates the susceptor 160, the alternating magnetic field causes heating of the susceptor 160. For example, eddy currents are generated in the susceptor 160 which is heated as a result. Further heating is provided by magnetic hysteresis losses within the susceptor 160. The heated susceptor 160 heats the aerosol-forming substrate 110 of the aerosol-generating article 100 to a sufficient temperature to form an aerosol. The aerosol is drawn downstream through the aerosol-generating article 100 and inhaled by the user.

The controller 330 may be a microcontroller, preferably a programmable microcontroller. The controller 330 is programmed to regulate the supply of power from the DC power source 310 to the inductive heating arrangement 320 in order to control the temperature of the susceptor 160.

Figure 6:
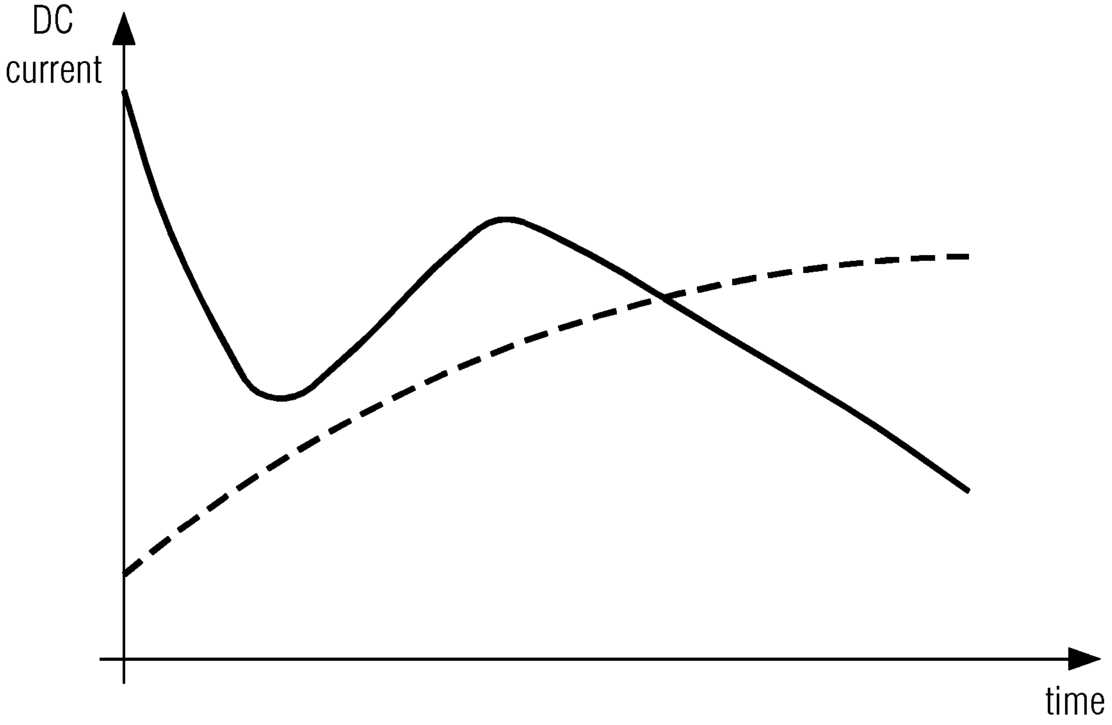
FIG. 6 is a graph of DC current vs. time illustrating the remotely detectable current changes that occur when a susceptor material undergoes a phase transition associated with its Curie point.

FIG. 6 illustrates the relationship between the DC current $I_{DC}$ drawn from the power source 310 over time as the temperature of the susceptor 160 (indicated by the dashed line) increases. The DC current $I_{DC}$ drawn from the power source 310 is measured at an input side of the DC/AC converter 340. For the purpose of this illustration, it may be assumed that the voltage V D c of the power source 310 remains approximately constant. As the susceptor 160 is inductively heated, the apparent resistance of the susceptor 160 increases. This increase in resistance is observed as a decrease in the DC current $I_{DC}$ drawn from the power source 310, which at constant voltage decreases as the temperature of the susceptor 160 increases. The high frequency alternating magnetic field provided by the inductor 240 induces eddy currents in close proximity to the susceptor surface, an effect that is known as the skin effect. The resistance in the susceptor 160 depends in part on the electrical resistivity of the first susceptor material, the resistivity of the second susceptor material and in part on the depth of the skin layer in each material available for induced eddy currents, and the resistivity is in turn temperature dependent. As the second susceptor material reaches its Curie temperature, it loses its magnetic properties. This causes an increase in the skin layer available for eddy currents in the second susceptor material, which causes a decrease in the apparent resistance of the susceptor 160. The result is a temporary increase in the detected DC current $I_{DC}$ when the skin depth of the second susceptor material begins to increase, the resistance begins to fall. This is seen as the valley (the local minimum) in FIG. 6. The current continues to increase until the maximum skin depth is reached, which coincides with the point where the second susceptor material has lost its spontaneous magnetic properties. This point is called the Curie temperature and is seen as the hill (the local maximum) in FIG. 6. At this point the second susceptor material has undergone a phase change from a ferro-magnetic or ferri-magnetic state to a paramagnetic state. At this point, the susceptor 160 is at a known temperature (the Curie temperature, which is an intrinsic material-specific temperature). If the inductor 240 continues to generate an alternating magnetic field (i.e. power to the DC/AC converter 340 is not interrupted) after the Curie temperature has been reached, the eddy currents generated in the susceptor 160 will run against the resistance of the susceptor 160, whereby Joule heating in the susceptor 160 will continue, and thereby the resistance will increase again (the resistance will have a polynomial dependence of the temperature, which for most metallic susceptor materials can be approximated to a third degree polynomial dependence for our purposes) and current will start falling again as long as the inductor 240 continues to provide power to the susceptor 160.

Therefore, as can be seen from FIG. 6, the apparent resistance of the susceptor 160 (and correspondingly the current $I_{DC}$ drawn from the power source 310) may vary with the temperature of the susceptor 160 in a strictly monotonic relationship over certain ranges of temperature of the susceptor 160. The strictly monotonic relationship allows for an unambiguous determination of the temperature of the susceptor 160 from a determination of the apparent resistance or apparent conductance (1/R). This is because each determined value of the apparent resistance is representative of only one single value of the temperature, so that there is no ambiguity in the relationship. The monotonic relationship of the temperature of the susceptor 160 and the apparent resistance allows for the determination and control of the temperature of the susceptor 160 and thus for the determination and control of the temperature of the aerosol-forming substrate 110. The apparent resistance of the susceptor 160 can be remotely detected by monitoring at least the DC current $I_{DC}$ drawn from the DC power source 310.

At least the DC current $I_{DC}$ drawn from the power source 310 is monitored by the controller 330. Preferably, both the DC current $I_{DC}$ drawn from the power source 310 and the DC supply voltage $V_{DC}$ are monitored. The controller 330 regulates the supply of power provided to the heating arrangement 320 based on a conductance value or a resistance value, where conductance is defined as the ratio of the DC current $I_{DC}$ to the DC supply voltage $V_{DC}$ and resistance is defined as the ratio of the DC supply voltage $V_{DC}$ to the DC current $I_{DC}$. The heating arrangement 320 may comprise a current sensor (not shown) to measure the DC current $I_{DC}$. The heating arrangement may optionally comprise a voltage sensor (not shown) to measure the DC supply voltage $V_{DC}$. The current sensor and the voltage sensor are located at an input side of the DC/AC converter 340. The DC current $I_{DC}$ and optionally the DC supply voltage $V_{DC}$ are provided by feedback channels to the controller 330 to control the further supply of AC power $P_{AC}$ to the inductor 240.

The controller 330 may control the temperature of the susceptor 160 by maintaining the measured conductance value or the measured resistance value at a target value corresponding to a target operating temperature of the susceptor 160. The controller 330 may use any suitable control loop to maintain the measured conductance value or the measured resistance value at the target value, for example by using a proportional-integral-derivative control loop.

In order to take advantage of the strictly monotonic relationship between the apparent resistance (or apparent conductance) of the susceptor 160 and the temperature of the susceptor 160, during user operation for producing an aerosol, the conductance value or the resistance value associated with the susceptor and measured at the input side of the DC/AC converter 340 is maintained between a first calibration value corresponding to a first calibration temperature and a second calibration value corresponding to a second calibration temperature. The second calibration temperature is the Curie temperature of the second susceptor material (the hill in the current plot in FIG. 6). The first calibration temperature is a temperature greater than or equal to the temperature of the susceptor at which the skin depth of the second susceptor material begins to increase (leading to a temporary lowering of the resistance). Thus, the first calibration temperature is a temperature greater than or equal to the temperature at maximum permeability of the second susceptor material. The first calibration temperature is at least 50 degrees Celsius lower than the second calibration temperature. At least the second calibration value may be determined by calibration of the susceptor 160, as will be described in more detail below. The first calibration value and the second calibration value may be stored as calibration values in a memory of the controller 330.

Since the conductance (resistance) will have a polynomial dependence on the temperature, the conductance (resistance) will behave in a nonlinear manner as a function of temperature. However, the first and second calibration values are chosen so that this dependence may be approximated as being linear between the first calibration value and the second calibration value because the difference between the first and second calibration values is small, and the first and second calibration values are in the upper part of the operational temperature range. Therefore, to adjust the temperature to a target operating temperature, the conductance is regulated according to the first calibration value and the second calibration value, through linear equations. For example, if the first and the second calibration values are conductance values, the target conductance value corresponding to the target operating temperature may be given by:

$$G_{Target}=G_{Lower}+(x\times\Delta G)$$

where ΔG is the difference between the first conductance value and the second conductance value and x is a percentage of ΔG.

The controller 330 may control the provision of power to the heating arrangement 320 by adjusting the duty cycle of the switching transistor 410 of the DC/AC converter 340. For example, during heating, the DC/AC converter 340 continuously generates alternating current that heats the susceptor 160, and simultaneously the DC supply voltage $V_{DC}$ and the DC current $I_{DC}$ may be measured, preferably every millisecond for a period of 100 milliseconds. If the conductance is monitored by the controller 330, when the conductance reaches or exceeds a value corresponding to the target operating temperature, the duty cycle of the switching transistor 410 is reduced. If the resistance is monitored by the controller 330, when the resistance reaches or goes below a value corresponding to the target operating temperature, the duty cycle of the switching transistor 410 is reduced. For example, the duty cycle of the switching transistor 410 may be reduced to about 9%. In other words, the switching transistor 410 may be switched to a mode in which it generates pulses only every 10 milliseconds for a duration of 1 millisecond. During this 1 millisecond on-state (conductive state) of the switching transistor 410, the values of the DC supply voltage $V_{DC}$ and of the DC current $I_{DC}$ are measured and the conductance is determined. As the conductance decreases (or the resistance increases) to indicate that the temperature of the susceptor 160 is below the target operating temperature, the gate of the transistor 410 is again supplied with the train of pulses at the chosen drive frequency for the system.

The power may be supplied by the controller 330 to the inductor 240 in the form of a series of successive pulses of electrical current. In particular, power may be supplied to the inductor 240 in a series of pulses, each separated by a time interval. The series of successive pulses may comprise two or more heating pulses and one or more probing pulses between successive heating pulses. The heating pulses have an intensity such as to heat the susceptor 160. The probing pulses are isolated power pulses having an intensity such not to heat the susceptor 160 but rather to obtain a feedback on the conductance value or resistance value and then on the evolution (decreasing) of the susceptor temperature. The controller 330 may control the power by controlling the duration of the time interval between successive heating pulses of power supplied by the DC power supply to the inductor 240. Additionally or alternatively, the controller 330 may control the power by controlling the length (in other words, the duration) of each of the successive heating pulses of power supplied by the DC power supply to the inductor 240.

The controller 330 is programmed to perform a calibration process in order to obtain the calibration values at which the conductance is measured at known temperatures of the susceptor 160. The known temperatures of the susceptor may be the first calibration temperature corresponding to the first calibration value and the second calibration temperature corresponding to the second calibration value. Preferably, the calibration process is performed each time the user operates the aerosol-generating device 200, for example each time the user inserts an aerosol-generating article 100 into an aerosol-generating device 200.

During the calibration process, the controller 330 controls the DC/AC converter 340 to continuously or continually supply power to the inductor 240 in order to heat the susceptor 160. The controller 330 monitors the conductance or resistance associated with the susceptor 160 by measuring the current $I_{DC}$ drawn by the power supply and, optionally the power supply voltage $V_{DC}$. As discussed above in relation to FIG. 6, as the susceptor 160 is heated, the measured current decreases until a first turning point is reached and the current begins to increase. This first turning point corresponds to a local minimum conductance value (a local maximum resistance value). The controller 330 may record the local minimum value of conductance (or local maximum of resistance) as the first calibration value. The controller may record the value of conductance or resistance at a predetermined time after the minimum current has been reached as the first calibration value. The conductance or resistance may be determined based on the measured current $I_{DC}$ and the measured voltage $V_{DC}$. Alternatively, it may be assumed that the power supply voltage $V_{DC}$, which is a known property of the power source 310, is approximately constant. The temperature of the susceptor 160 at the first calibration value is referred to as the first calibration temperature. Preferably, the first calibration temperature is between 150 degrees Celsius and 350 degrees Celsius. More preferably, when the aerosol-forming substrate 110 comprises tobacco, the first calibration temperature is 320 degrees Celsius. The first calibration temperature is at least 50 degrees Celsius lower than the second calibration temperature.

As the controller 330 continues to control the power provided by the DC/AC converter 340 to the inductor 240, the measured current increases until a second turning point is reached and a maximum current is observed (corresponding to the Curie temperature of the second susceptor material) before the measured current begins to decrease. This turning point corresponds to a local maximum conductance value (a local minimum resistance value). The controller 330 records the local maximum value of the conductance (or local minimum of resistance) as the second calibration value. The temperature of the susceptor 160 at the second calibration value is referred to as the second calibration temperature. Preferably, the second calibration temperature is between 200 degrees Celsius and 400 degrees Celsius. When the maximum is detected, the controller 330 controls the DC/AC converter 340 to interrupt provision of power to the inductor 240, resulting in a decrease in susceptor 160 temperature and a corresponding decrease in conductance.

Due to the shape of the graph, this process of continuously heating the susceptor 160 to obtain the first calibration value and the second calibration value may be repeated at least once. After interrupting provision of power to the inductor 240, the controller 330 continues to monitor the conductance (or resistance) until a third turning point corresponding to a second minimum conductance value (a second maximum resistance value) is observed. When the third turning point is detected, the controller 330 controls the DC/AC converter 340 to continuously provide power to the inductor 240 until a fourth turning point corresponding to a second maximum conductance value (second minimum resistance value) is detected. The controller 330 stores the conductance value or the resistance value at or just after the third turning point as the first calibration value and the conductance value or the resistance value at the fourth turning point current as the second calibration value. The repetition of the measurement of the turning points corresponding to minimum and maximum measured current significantly improves the subsequent temperature regulation during user operation of the device for producing an aerosol. Preferably, controller 330 regulates the power based on the conductance or resistance values obtained from the second maximum and the second minimum, this being more reliable because the heat will have had more time to distribute within the aerosol-forming substrate 110 and the susceptor 160.

In order to further improve the reliability of the calibration process, the controller 310 may be optionally programmed to perform a pre-heating process before the calibration process. For example, if the aerosol-forming substrate 110 is particularly dry or in similar conditions, the calibration may be performed before heat has spread within the aerosol-forming substrate 110, reducing the reliability of the calibration values. If the aerosol-forming substrate 110 were humid, the susceptor 160 takes more time to reach the valley temperature (due to water content in the substrate 110).

To perform the pre-heating process, the controller 330 is configured to continuously provide power to the inductor 240. As described above, the current starts decreasing with increasing susceptor 160 temperature until the minimum is reached. At this stage, the controller 330 is configured to wait for a predetermined period of time to allow the susceptor 160 to cool before continuing heating. The controller 330 therefore controls the DC/AC converter 340 to interrupt provision of power to the inductor 240. After the predetermined period of time, the controller 330 controls the DC/AC converter 340 to provide power until the minimum is reached. At this point, the controller controls the DC/AC converter 340 to interrupt provision of power to the inductor 240 again. The controller 330 again waits for the same predetermined period of time to allow the susceptor 160 to cool before continuing heating. This heating and cooling of the susceptor 160 is repeated for the predetermined duration of time of the pre-heating process. The predetermined duration of the pre-heating process is preferably 11 seconds. The predetermined combined durations of the pre-heating process followed by the calibration process is preferably 20 seconds.

If the aerosol-forming substrate 110 is dry, the first minimum of the pre-heating process is reached within the pre-determined period of time and the interruption of power will be repeated until the end of the predetermined time period. If the aerosol-forming substrate 110 is humid, the first minimum of the pre-heating process will be reached towards the end of the pre-determined time period. Therefore, performing the pre-heating process for a predetermined duration ensures that, whatever the physical condition of the substrate 110, the time is sufficient for the substrate 110 to reach the minimum temperature, in order to be ready to feed continuous power and reach the first maximum. This allows a calibration as early as possible, but still without risking that the substrate 110 would not have reached the valley beforehand.

Further, the aerosol-generating article 100 may be configured such that the minimum is always reached within the predetermined duration of the pre-heating process. If the minimum is not reached within the pre-determined duration of the pre-heating process, this may indicate that the aerosol-generating article 100 comprising the aerosol-forming substrate 110 is not suitable for use with the aerosol-generating device 200. For example, the aerosol-generating article 100 may comprise a different or lower-quality aerosol-forming substrate 110 than the aerosol-forming substrate 100 intended for use with the aerosol-generating device 200. As another example, the aerosol-generating article 100 may not be configured for use with the heating arrangement 320, for example if the aerosol-generating article 100 and the aerosol-generating device 200 are manufactured by different manufacturers. Thus, the controller 330 may be configured to generate a control signal to cease operation of the aerosol-generating device 200.

The pre-heating process may be performed in response to receiving a user input, for example user activation of the aerosol-generating device 200. Additionally or alternatively, the controller 330 may be configured to detect the presence of an aerosol-generating article 100 in the aerosol-generating device 200 and the pre-heating process may be performed in response to detecting the presence of the aerosol-generating article 100 within the cavity 220 of the aerosol-generating device 200.

Figure 7:
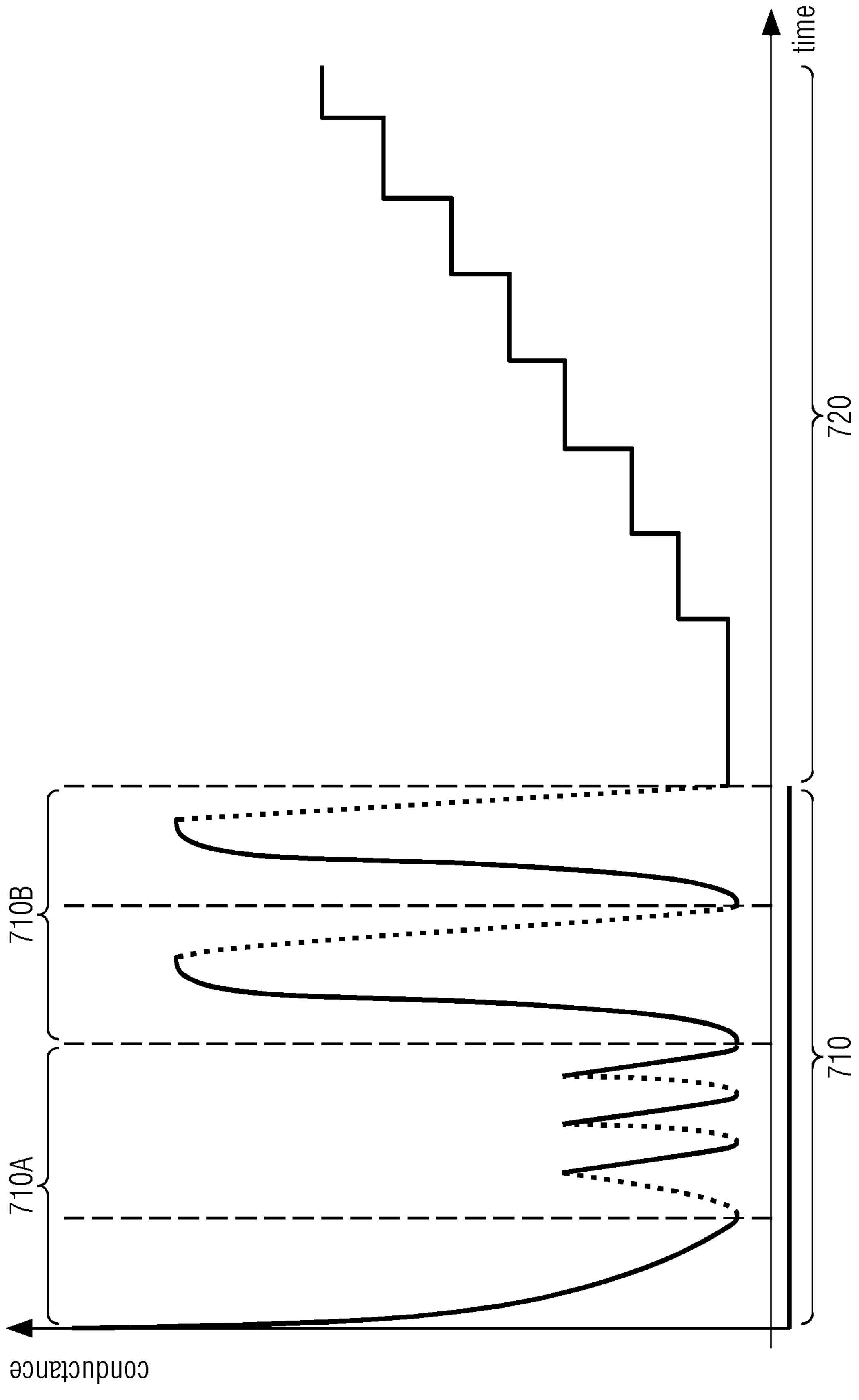
FIG. 7 illustrates a temperature profile of the susceptor during operation of the aerosol-generating device.

FIG. 7 is a graph of conductance against time showing a heating profile of the susceptor 160. The graph illustrates two consecutive phases of heating: a first heating phase 710 comprising the pre-heating process 710A and the calibration process 710B described above, and a second heating phase 720 corresponding to user operation of the aerosol-generating device 200 to produce an aerosol. Although FIG. 7 is illustrated as a graph of conductance against time, it is to be understood that the controller 330 may be configured to control the heating of the susceptor during the first heating phase 710 and the second heating phase 720 based on measured resistance or current as described above.

Further, although the techniques to control of the heating of the susceptor during the first heating phase 710 and the second heating phase 720 have been described above based on a determined conductance value or a determined resistance value associated with the susceptor, it is to be understood that the techniques described above could be performed based on a value of current measured at the input of the DC/AC converter 340.

As can be seen from FIG. 7, the second heating phase 720 comprises a plurality of conductance steps, corresponding to a plurality of temperature steps from a first operating temperature of the susceptor 160 to a second operating temperature of the susceptor 160. The first operating temperature of the susceptor is a minimum temperature at which the aerosol-forming substrate will form an aerosol in a sufficient volume and quantity for a satisfactory experience when inhaled a user. The second operating temperature of the susceptor is the temperature at maximum temperature at which it is desirable for the aerosol-forming substrate to be heated for the user to inhale the aerosol. The first operating temperature of the susceptor 160 is greater than or equal to the first calibration temperature of the susceptor 160 at the valley of the current plot shown in FIG. 6. The first operating temperature may be between 150 degrees Celsius and 330 degrees Celsius. The second operating temperature of the susceptor is less than or equal to the second calibration temperature of the susceptor 160 at the Curie temperature of the second susceptor material. The second operating temperature may be between 200 degrees Celsius and 400 degrees Celsius. The difference between the first operating temperature and the second operating temperature is at least 50 degree Celsius. The first operating temperature of the susceptor is a temperature at which the aerosol-forming substrate 110 forms an aerosol so that an aerosol is formed during each temperature step.

It is to be understood that the number of temperature steps illustrated in FIG. 7 is exemplary and that second heating phase 720 comprises at least three consecutive temperature steps, preferably between two and fourteen temperature steps, most preferably between three and eight temperature steps. Each temperature step may have a predetermined duration. Preferably the duration of the first temperature step is longer than the duration of subsequent temperature steps. The duration of each temperature step is preferably longer than 10 seconds, preferably between 30 seconds and 200 seconds, more preferably between 40 seconds and 160 seconds. The duration of each temperature step may correspond to a predetermined number of user puffs. Preferably, the first temperature step corresponds to four user puffs and each subsequent temperature step corresponds to one user puff.

For the duration of each temperature step, the temperature of the susceptor 160 is maintained at a target operating temperature corresponding to the respective temperature step. Thus, for the duration of each temperature step, the controller 330 controls the provision of power to the heating arrangement 320 such that the conductance is maintained at a value corresponding to the target operating temperature of the respective temperature step as described above. Target conductance values for each temperature step may be stored in the memory of the controller 330.

As an example, the second heating phase 720 may comprise five temperature steps: a first temperature step having a duration of 160 seconds and a target conductance value of $G_{Target}\,G_{Lower}+(0.09\times\Delta G)$, a second temperature step having a duration of 40 seconds and a target conductance value of $G_{Target}=G_{Lower}+(0.25\times\Delta G)$, a third temperature step having a duration of 40 seconds and a target conductance value of $G_{Target}=G_{Lower}\ (0.4\times\Delta G)$, a fourth temperature step having a duration of 40 seconds and a target conductance value of $G_{Target}\ G_{Lower}+(0.56\times\Delta G)$ and a fifth temperature step having a duration of 85 seconds and a target conductance value of $G_{Target}=G_{Lower}+(0.75\times\Delta G)$. These temperature steps may correspond to temperatures of 330 degrees Celsius, 340 degrees Celsius, 345 degrees Celsius, 355 degrees Celsius and 380 degrees Celsius.

Figure 8:
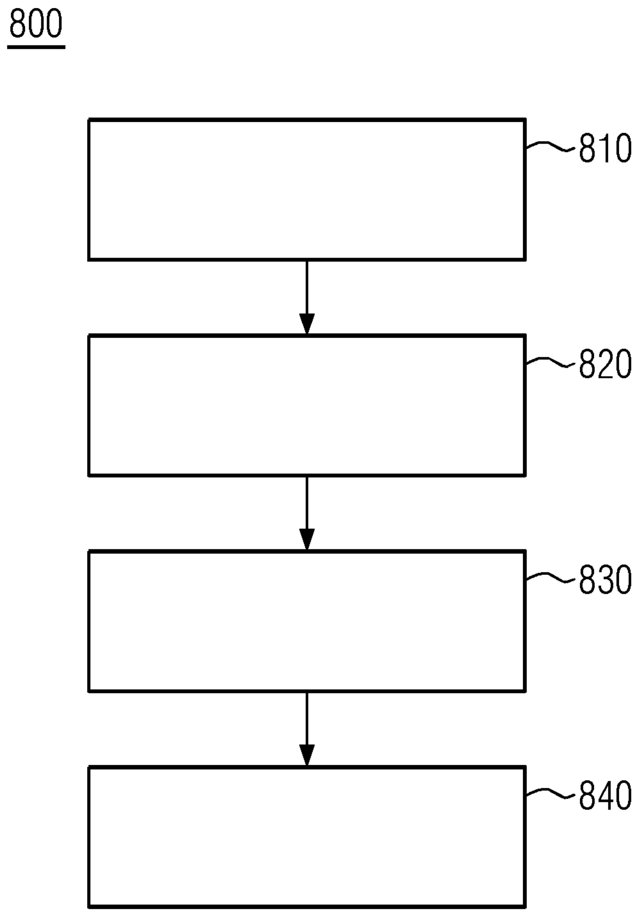
FIG. 8 is a flow diagram showing a method for controlling aerosol-production in the aerosol-generating device of FIG. 2.

FIG. 8 is a flow diagram of a method 800 for controlling aerosol-production in an aerosol-generating device 200. As described above, the controller 330 may be programmed to perform the method 800.

The method begins at step 810, where the controller 330 detects user operation of the aerosol-generating device 200 for producing an aerosol. Detecting user operation of the aerosol-generating device 200 may comprise detecting a user input, for example user activation of the aerosol-generating device 200. Additionally or alternatively, detecting user operation of the aerosol-generating device 200 may comprise detecting that an aerosol-generating article 100 has been inserted into the aerosol-generating device 200.

In response to detecting the user operation at step 810, the controller 330 may be configured to perform the optional pre-heating process described above. At the end of the predetermined duration of the pre-heating process, the controller 330 performs the calibration process (step 820) as described above. Alternatively, the controller 330 may be configured to proceed to step 820 in response to detecting the user operation at step 810. Following completion of the calibration process, the controller 330 performs the second heating phase in which the aerosol is produced at step 840.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein. Within this context, a number A may be considered to include numerical values that are within general standard error for the measurement of the property that the number A modifies. The number A, in some instances as used in the appended claims, may deviate by the percentages enumerated above provided that the amount by which A deviates does not materially affect the basic and novel characteristic(s) of the claimed invention. Also, all ranges include the maximum and minimum points disclosed and include any intermediate ranges therein, which may or may not be specifically enumerated herein.

The invention claimed is:

1. A method for controlling aerosol production in an aerosol-generating device, the aerosol-generating device comprising an inductive heating arrangement and a power source configured to provide power to the inductive heating arrangement, and the method comprising:

performing, during a first heating phase during user operation of the aerosol-generating device for producing an aerosol, a calibration process for defining a first calibration value and a second calibration value of the inductive heating arrangement, wherein the first calibration value is associated with a first calibration temperature of a susceptor inductively coupled to the inductive heating arrangement and the second calibration value is associated with a second calibration temperature of the susceptor, and wherein the susceptor is configured to heat an aerosol-forming substrate; and during a second heating phase during the user operation of the aerosol-generating device, controlling power provided to the inductive heating arrangement to maintain a target operating value of the inductive heating arrangement within the first calibration value and the second calibration value, wherein performing the calibration process comprises the steps of:

(i) controlling the power provided to the inductive heating arrangement to cause an increase of a temperature of the susceptor, (ii) monitoring a value associated with current associated with the susceptor, the value associated with current referring to a value determined by measuring current, (iii) interrupting provision of power to the inductive heating arrangement when the value reaches a first extremum, wherein the value associated with current at the first extremum corresponds to the second calibration value, and (iv) monitoring the value until the value reaches a second extremum, wherein the value associated with current at the second extremum corresponds to the first calibration value, wherein performing the calibration process further comprises, in response to determining that the value associated with current has reached the second extremum, repeating steps (i) to (iv), and wherein the first calibration value and the second calibration value correspond to values associated with the current measured during at least a first repetition of steps (i) to (iv).

2. The method according to claim 1, wherein the first calibration value is a first conductance value, the second calibration value is a second conductance value, and the target operating value is a target conductance value.

3. The method according to claim 2, wherein step (ii) of the calibration process comprises monitoring a conductance value associated with the susceptor, wherein step (iii) of the calibration process comprises interrupting provision of power to the inductive heating arrangement when the conductance value reaches a maximum, wherein the conductance value at the maximum corresponds to the second calibration value, and step (iv) of the calibration process comprises monitoring the conductance value until the conductance value reaches a minimum, wherein the conductance value at the minimum corresponds to the first calibration value.

4. The method according to claim 3, wherein the monitoring the conductance value comprises measuring, at an input side of the DC/AC converter, DC current drawn from the power source.

5. The method according to claim 1, further comprising, during the first heating phase, performing a pre-heating process, wherein the pre-heating process is performed before the calibration process, and wherein the pre-heating process has a predetermined duration.

6. The method according to claim 5, wherein the pre-heating process comprises the steps of:

i) controlling the power provided to the inductive heating arrangement to cause an increase of the temperature of the susceptor, ii) monitoring, at the power source, a current value associated with the susceptor, and iii) interrupting provision of power to the susceptor when the current value reaches a minimum.

7. The method according to claim 6, further comprising, if the current value reaches a minimum before an end of the predetermined duration of the pre-heating process, repeating steps (i) to (iii) of the pre-heating process until the end of the pre-determined duration of the pre-heating process.

8. The method according to claim 6, further comprising, if the current value associated with the susceptor does not reach a minimum during the predetermined duration of pre-heating process, ceasing operation of the aerosol-generating device.

9. The method according to claim 5, wherein the aerosol-generating device is configured to removably receive an aerosol-generating article, wherein the aerosol-generating article comprises the susceptor and the aerosol-forming substrate, and wherein the pre-heating process is performed in response to detecting a presence of the aerosol-generating article in the aerosol-generating device.

10. The method according to claim 1, wherein controlling the power provided to the inductive heating arrangement during the second heating phase further comprises controlling the power provided to the inductive heating arrangement to cause a step-wise increase of the target operating value from a first target operating value associated with a first operating temperature of a susceptor to a second target operating value associated with a second operating temperature of a susceptor.

11. An aerosol-generating system, comprising the aerosol-generating device according to claim 1 and an aerosol-generating article, wherein the aerosol-generating article comprises the aerosol-forming substrate and the susceptor.

12. The aerosol-generating system according to claim 11, wherein the aerosol-forming susceptor comprises a first layer consisting of a first material and a second layer consisting of a second material, wherein the first material is disposed in physical contact with the second material.

13. The aerosol-generating system according to claim 12, wherein the first material has a first Curie temperature and the second material has a second Curie temperature, and wherein the second Curie temperature is lower than the first Curie temperature.

14. An aerosol-generating device, comprising:

a power source configured to provide a DC supply voltage and a DC current; and power supply electronics connected to the power source, wherein the power supply electronics comprise:

a DC/AC converter, an inductor connected to the DC/AC converter and being configured to generate an alternating magnetic field when energized by an alternating current from the DC/AC converter, the inductor being couplable to a susceptor, wherein the susceptor is configured to heat an aerosol-forming substrate, and a controller configured to:

perform, during a first heating phase during user operation of the aerosol-generating device for generating an aerosol, a calibration process for defining a first calibration value and a second calibration value of the power supply electronics, wherein the first calibration value is associated with a first calibration temperature of the susceptor and the second calibration value is associated with a second calibration temperature of the susceptor, and control, during a second heating phase during the user operation of the aerosol-generating device for producing the aerosol, power provided to the power supply electronics to maintain a target operating value of the power supply electronics within the first calibration value and the second calibration value, wherein performing the calibration process comprises the steps of:

(i) controlling the power provided to the inductor to cause an increase of a temperature of the susceptor, (ii) monitoring a value associated with current associated with the susceptor, the value associated with current referring to a value determined by measuring current, (iii) interrupting provision of power to the inductor when the value reaches a first extremum, wherein the value associated with current at the first extremum corresponds to the second calibration value, and (iv) monitoring the value until the value reaches a second extremum, wherein the value associated with current at the second extremum corresponds to the first calibration value, wherein performing the calibration process further comprises, in response to determining that the value associated with current has reached the second extremum, repeating steps (i) to (iv), and wherein the first calibration value and the second calibration value correspond to values associated with the current measured during at least a first repetition of steps (i) to (iv).

15. The aerosol-generating device according to claim 14, wherein the second calibration temperature of the susceptor corresponds to a Curie temperature of a material of the susceptor.

16. The aerosol-generating device according to claim 14, wherein the first calibration value is a first resistance value, the second calibration value is a second resistance value, and the target operating value is a target resistance value.

17. The aerosol-generating device according to claim 16, wherein step ii) of the calibration process comprises monitoring a resistance value associated with the susceptor, wherein step iii) of the calibration process comprises interrupting provision of power to the inductor when the resistance value reaches a minimum, wherein the resistance value at the minimum corresponds to the second calibration value, and wherein step iv) of the calibration process comprises monitoring the resistance value until the resistance value reaches a maximum, wherein the resistance value at the maximum corresponds to the first calibration value.

18. The aerosol-generating device according to claim 14, wherein power from the power source is supplied to the inductor, via the DC/AC converter, as a plurality of pulses, each pulse separated by a time interval.

19. The aerosol-generating device according to claim 18, wherein controlling the power provided to the power supply electronics comprises controlling the time interval between each of the plurality of pulses.

20. The aerosol-generating device according to claim 18, wherein controlling the power provided to the power supply electronics comprises controlling a length of each pulse of the plurality of pulses.

* * * * *